US008620243B2

(12) United States Patent
Thompson et al.

(10) Patent No.: US 8,620,243 B2
(45) Date of Patent: Dec. 31, 2013

(54) SYSTEM AND METHOD FOR AN INTELLIGENT RADIO FREQUENCY RECEIVER

(75) Inventors: Steven Thompson, Forest, VA (US); Charles Morrison, Forest, VA (US)

(73) Assignee: Anite Finland Oy, Helsinki (FI)

( * ) Notice: Subject to any disclaimer, the term of this patent is extended or adjusted under 35 U.S.C. 154(b) by 265 days.

(21) Appl. No.: 13/058,787

(22) PCT Filed: Aug. 6, 2009

(86) PCT No.: PCT/US2009/053030
§ 371 (c)(1),
(2), (4) Date: Feb. 11, 2011

(87) PCT Pub. No.: WO2010/019449
PCT Pub. Date: Feb. 18, 2010

(65) Prior Publication Data
US 2011/0150045 A1    Jun. 23, 2011

Related U.S. Application Data

(60) Provisional application No. 61/088,938, filed on Aug. 14, 2008.

(51) Int. Cl.
*H04B 1/26* (2006.01)
(52) U.S. Cl.
USPC ......................................... 455/130; 455/334

(58) Field of Classification Search
USPC .............. 455/78, 80, 86, 550.1, 552.1, 553.1, 455/130, 313, 314, 315, 334
See application file for complete search history.

(56) References Cited

U.S. PATENT DOCUMENTS

| | | | |
|---|---|---|---|
| 6,359,940 B1 | 3/2002 | Ciccarelli | |
| 6,584,304 B1 | 6/2003 | Thomsen | |
| 7,280,509 B2 * | 10/2007 | Kim ........................... | 455/552.1 |
| 7,372,927 B2 | 5/2008 | Lee et al. | |
| 8,103,305 B2 * | 1/2012 | Rooyen ...................... | 455/553.1 |
| 2003/0054782 A1 | 3/2003 | Snider | |

OTHER PUBLICATIONS

International Searching Authority, Korean Intellectual Property Office, International Search Report, in related International Application PCT/US2009/053030, 1 page.

* cited by examiner

*Primary Examiner* — Thanh Le
(74) *Attorney, Agent, or Firm* — Duane Morris LLP

(57) ABSTRACT

A method a system for receiving signals from plural frequency bands and plural communication protocols. An interchangeable radio frequency ("RF") front end may receive RF signals from plural frequency bands and plural communication protocols. Intermediate frequency ("IF") circuitry may produce one or more common IF signals from the received RF signals. A common digital back end may then receive digitized versions of the IF signals, modify IF signal bandwidth as a function of the plural communication protocols, and process plural received signals without knowledge of the underlying communication protocols.

32 Claims, 13 Drawing Sheets

SYSTEM AND METHOD FOR AN INTELLIGENT RADIO FREQUENCY RECEIVER

RELATED APPLICATIONS AND PRIORITY CLAIM

The instant application is a PCT national phase application of and claims the priority benefit of PCT International Application Number PCT/US2009/053030 having an international filing date of 6 Aug. 2009, a priority date of 14 Aug. 2008, and entitled "System and Method for an Intelligent Radio Frequency Receiver", which claims priority benefit of U.S. Provisional Patent Application No. 61/088,938, entitled "System and Method for an Intelligent Radio Frequency Receiver," having a filing date of 14 Aug. 2008, the entirety of each are hereby incorporated herein by reference.

BACKGROUND

Current solutions for optimizing cellular wireless networks involve a process of gathering network data and processing that data to determine the best possible optimization of network variables to minimize interference. The wireless industry is increasingly focusing on high quality of service, which is a competitive advantage for a wireless service provider. There are several elements to quality of service: coverage, speech quality, network accessibility/capacity, and number of dropped calls, to name a few. To monitor these elements, networks may gather data originating from a number of sources, including drive and/or field testing.

Drive testing is generally the process of driving the roads in a given market with test equipment typically including a laptop computer integrated with a wireless terminal, a GPS receiver and/or a demodulating scanning receiver. Once drive test data is collected, the data is typically provided to post-processing tools which apply various mathematical algorithms to the data to accomplish network planning and optimization. One example of post-processing is automatic frequency planning ("AFP"), where the data is processed to determine the optimal arrangement of frequencies to cell site sectors to minimize network interference. Another post-processing application is automatic cell planning ("ACP") which analyzes network variables (e.g., frequencies per cell site sector, cell site antenna height, azimuth and/or tilt, cell site sector's transmission power, cell site locations, multipath, and a host of other variables that impact radio frequency propagation) to aid network engineers in making decisions on how best to minimize interference in the network. Service providers and other network operators may also deploy dedicated measurement tools in the network as needed to perform field testing and measurements in response to consumer complaints and other indicators of poor network quality. Field testing equipment may include dedicated hardware deployed to collect measurement data.

As is well known in the art, various wireless protocols exist for defining communications in a mobile network. One such protocol is a time-division multiple access ("TDMA") protocol, such as the TIA/EIA-136 standard provided by the Telecommunications Industry Association ("TIA"). With TIA/EIA-136 TDMA, each channel carries a frame that is divided into eight time slots (two slots are consumed six time slots to support multiple (3 or 6) mobile units per channel). Other TDMA-based systems include Global System for Mobile ("GSM") communications systems, which use a TDMA frame divided into eight time slots (or burst periods). GSM has been the European standard and occupies the frequency ranges at 900 MHz and 1800 MHz. The U.S. version of GSM, GSM 1900 operates at 850 MHz and 1.9 GHz. Another exemplary protocol is a code-division multiple access ("CDMA") protocol. Of course, many other protocols and cellular technologies exist which are equally applicable to embodiments of the present subject matter (e.g., World Interoperability Microwave Access ("WiMAX"), Long Term Evolution ("LTE"), GPRS, EDGE, W-CDMA, HSPA, Orthogonal Frequency Division Multiple Access ("OFDMA") technologies, and Universal Mobile Telecommunications System ("UMTS") technologies, and WiFi, to name a few) and such a disclosure should in no way limit the scope of the claims appended herewith.

Generally, a cellular communication system comprises a plurality of nodes (e.g., cell sites or base stations) positioned throughout a geographical region, a Mobile Telephone Switching Office ("MTSO"), plural mobile devices, etc. Each cell site generally includes a high power antenna system coupled to a transmitter and a receiver utilizing plural channels each comprised of forward control channels, reverse control channel, forward voice channels, and reverse voice channels. The MTSO may act as a central coordinating site for the entire cellular network. Of course, the MTSO may include various features, components and systems (e.g., geolocation systems, positioning determining equipment) and may be identified by other terms in different technologies.

When a subscriber initiates a call from a mobile device, a call initiation request is placed on a reverse control channel. If applicable, the mobile device may transmit its Mobile Identification Number ("MIN") or other information (e.g., Electronic Serial Number, Station Class Mark, along with the destination telephone number. If a cell cite successfully receives this information, it is forwarded to the MTSO, which may verify subscriber registration and assigns the call to a forward and reverse voice channel pair. When a subscriber receives a call, the incoming call is received by the MTSO which may then direct each cell site to transmit on its FOCC a paging message containing the subscriber's MIN. Each mobile device constantly monitors the forward control channel and when its MIN is successfully detected, the mobile device transmits an acknowledgement signal on the reverse control channel. Upon a particular cell site receiving the acknowledgement signal, the MTSO directs that site to simultaneously issue a forward and reverse voice channel pair. In this manner, a conversation may be carried out on a dedicated channel pair separate from the control channels.

In order to monitor a cellular network's performance, detect fraudulent users, and troubleshoot problems, a service provider must be able to monitor the various control and voice channels. Monitoring real-time signals and signal to interference ratios at various locations in a service area is desirable and will allow a carrier to fine tune the network to improve its quality. Having drive or field testing capabilities that monitors all channels across multiple base station service areas and multiple technologies may provide the necessary data. Thus, there is an unmet need in the art to be able to quickly, accurately, and dynamically respond to perceived quality problems occurring within communication networks to be able to enhance quality of network services perceived by individual network users.

One embodiment of the present subject matter provides a method for blind determination processing of received signals. The method may comprise receiving RF signals from plural frequency bands and plural communication protocols in one or more receiver modules and downconverting the received signals into one or more common IF signals. The method may also comprise digitizing the one or more common IF signals, modifying IF signal bandwidth as a function of the plural communication protocols, and processing the modified signal in a processor without knowledge of the underlying plural communication protocols.

Another embodiment of the present subject matter may provide a method for processing signals based on a plurality of frequencies and protocols. The method may comprise receiving plural RF signals from plural frequency bands and plural communication protocols and converting one of the plural received RF signals into one or more common IF signals. The method may also comprise converting a second of the plural received signals into the one or more common IF signals and converting the one or more common IF signals into one or more baseband signals without knowledge of the underlying plural communication protocols.

One embodiment of the present subject matter may provide a receiver for receiving signals from plural frequency bands and plural communication protocols. The receiver may include an interchangeable RF front end having an A/D converter and an EEPROM having calibration data, wherein the RF front end receives RF signals from the plural frequency bands and said plural communication protocols. The receiver may also include IF circuitry producing one or more common IF signals from the received RF signals. A common digital back end may be provided for receiving digitized versions of the IF signals and modifying IF signal bandwidth as a function of the plural communication protocols, the back end having a host processor operatively connected to a host memory device via a host bus, one or more DSPs each operatively connected to at least one DSP memory device via a cluster bus, and an FPGA operatively connected to the host processor, the DSPs, a mezzanine bus, and the IF circuitry, wherein the FPGA receives the IF signal, modifies the IF signal bandwidth as a function of the plural communication protocols and determines a destination for the signal for processing where the destination is one of the one or more DSPs or the host processor, and sends the IF signal to the determined destination. The receiver may include a GPS receiver or a timing synchronization source for supplying timing signals to the RF front end and the common digital back end and may include a flash memory device operatively connected to the host bus for supplying configuration information.

Another embodiment of the present subject matter may provide a receiver for receiving signals from plural frequency bands and plural communication protocols. The receiver may include an interchangeable RF front end that receives RF signals from the plural frequency bands and communication protocols, IF circuitry producing one or more common IF signals from the received RF signals, digitizing the one or more common IF signals, wherein IF signal bandwidth changes as a function of the plural communication protocols. The receiver may also include a common digital back end for receiving the digitized versions of the IF signals and to process plural received signals without knowledge of the underlying communication protocols.

Yet a further embodiment of the present subject matter may provide a receiver for receiving signals from plural frequency bands and plural communication protocols, the receiver including modular RF circuitry having plural separate and selectable RF paths, each path having a predetermined frequency band. The receiver may also include IF circuitry having plural separate and selectable synthesizing paths, each synthesizing path corresponding to a selectable RF path. The receiver may include a converter for digitizing the IF signal, circuitry for modifying the digitized IF signal bandwidth as a function of the plural communication protocols, and common digital circuitry for receiving and processing the digitized IF signals, where components of the selectable RF and synthesizing paths are field-configurable as a function of the plural communication protocols.

An additional embodiment of the present subject matter provides a receiver for receiving signals from plural frequency bands and plural communication protocols, the receiver comprising modular RF circuitry having at least one separate and selectable RF path, the RF path having a predetermined frequency band. The receiver may also include IF circuitry having at least one separate and selectable synthesizing path, the synthesizing path corresponding to a selectable RF path. The receiver may also include a converter for digitizing the IF signal, circuitry for producing an digitized IF signal having a bandwidth changing as a function of the plural communication protocols, and common digital circuitry for receiving and processing the digitized IF signals, where components of the selectable RF and synthesizing paths are field-configurable as a function of the plural communication protocols.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for an intelligent radio frequency receiver are herein described.

Figure 1:
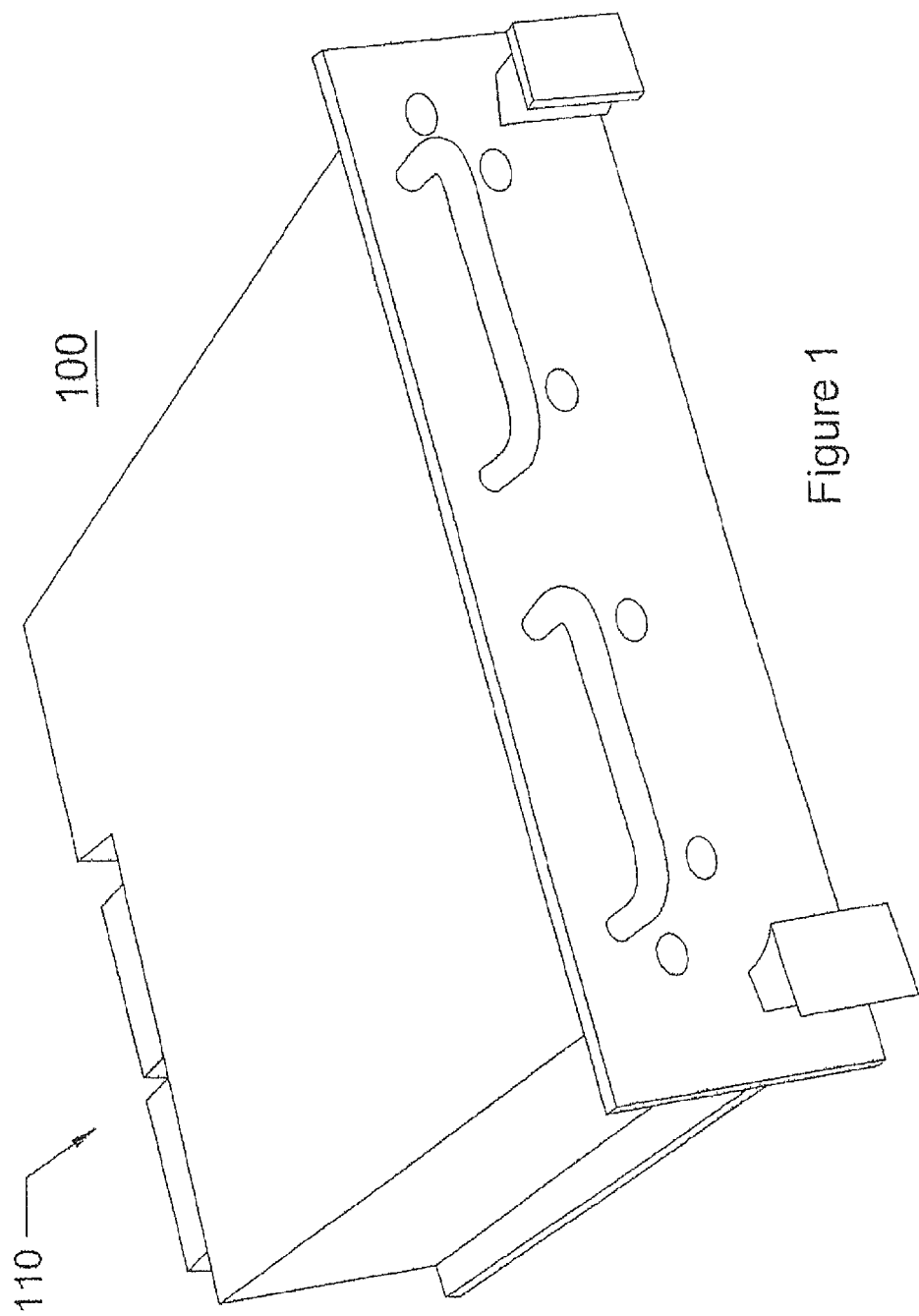
FIGS. 1 and 2 are illustrations of two embodiments of the present subject matter.
Figure 2:
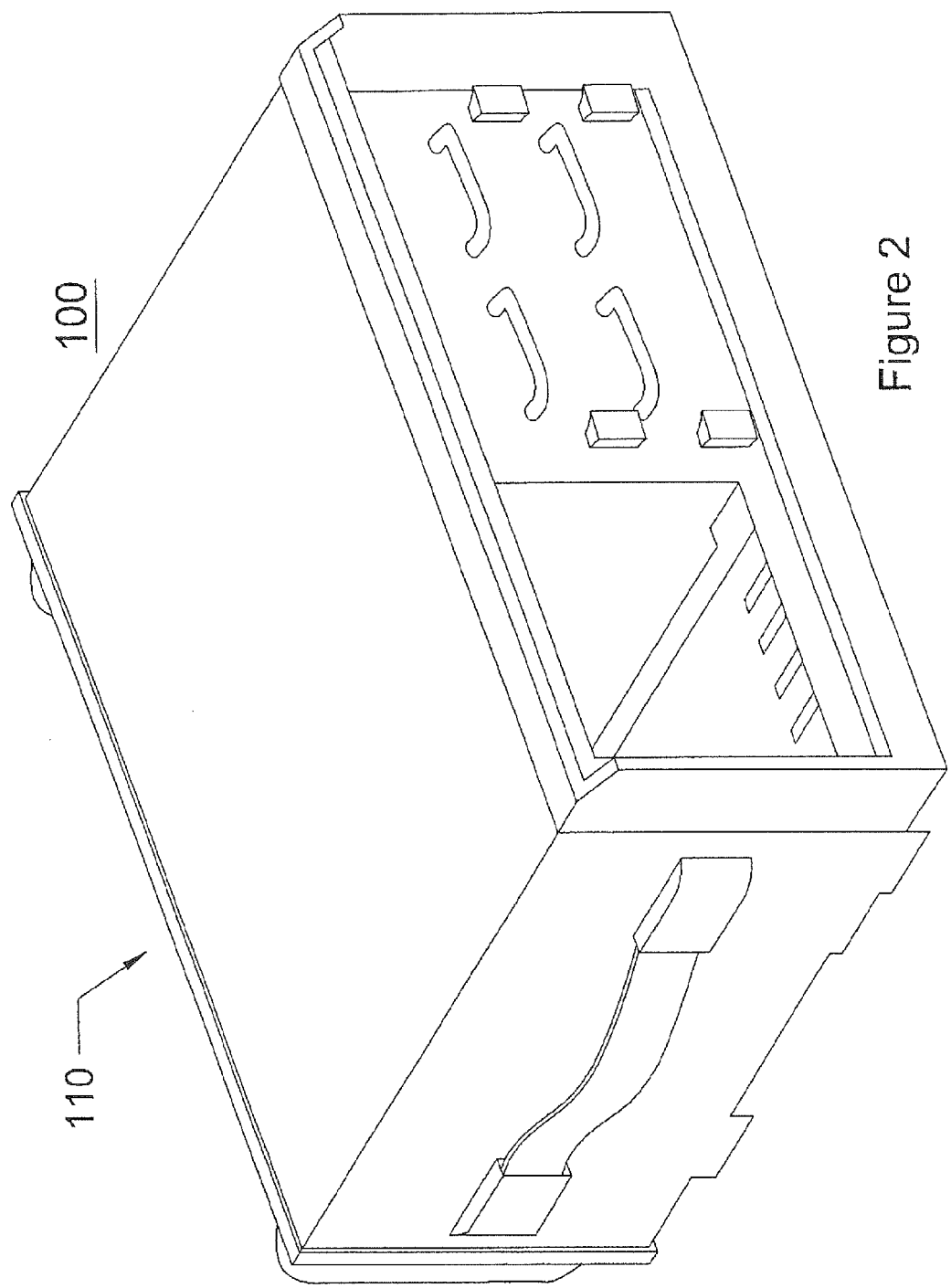

FIGS. 1 and 2 are illustrations of two embodiments of the present subject matter. With reference to FIGS. 1 and 2, an Intelligent Receiver ("IRX") 100 may generally be capable of receiving and decoding various cellular standards on the uplink or reverse channel and/or downlink or forward channel simultaneously. The IRX may receive any one or combination of the following technologies: W-CDMA, GSM, CDMA2000, EV-DO, TD-SCDMA, GSM, WiMAX, LTE, UMTS. Of course, this list is non-exhaustive and should not limit the scope of the claims appended herewith. The IRX's ability to perform simultaneous measurements across multiple technologies or protocols assures a network operator or engineer that the data quality, performance and test (drive or field) data density are not comprised thereby eliminating the need to use multiple scanning receivers during any testing and eliminating the need to perform redundant testing in a given network or market area. Typical applications may also include, but are not limited to 850 Cellular, 900, 1800, 1900, and 2100 band operation; narrow and wideband received signal strength indication ("RSSI") scanning, GSM base station identity code ("BSIC") decode scanning, CDMA & Rev. A PN scanning, UMTS W-CDMA scramble code scan, etc. An exemplary IRX assembly 110 may generally be modular with a radio frequency ("RF") to intermediate frequency ("IF") and Analog-to-Digital module, and a digital IF/baseband processor module. The hardware assembly 110 may be adaptable to fit within a standard digital receiver tray (not shown). The assembly 110 may also be adaptable to accommodate two tri- or multi-band RF front ends in a single tray. Of course, such an embodiment is exemplary only as it is envisioned that the assembly 110 may be scalable to more than two RF front ends or receivers.

Embodiments of the present subject matter may include two general components, an RF front end and a digital back end. Other embodiments may also include a time base circuit, such as a separate GPS time base circuit. The digital back end and/or RF front end may be coherent to GPS to thereby overcome any oscillator drift which would other render a receiver incapable of properly receiving a signal. In the event GPS signals cannot be received or created, embodiments of the present subject matter may task a particular frequency to be a reference frequency and an appropriate correction factor utilized. Embodiments of the present subject matter may also calibrate the time reference using GPS lock; however, if the GPS lock is lost, another frequency may be utilized as the reference frequency, e.g., a CDMA signal slaved to GPS.

Figure 3:
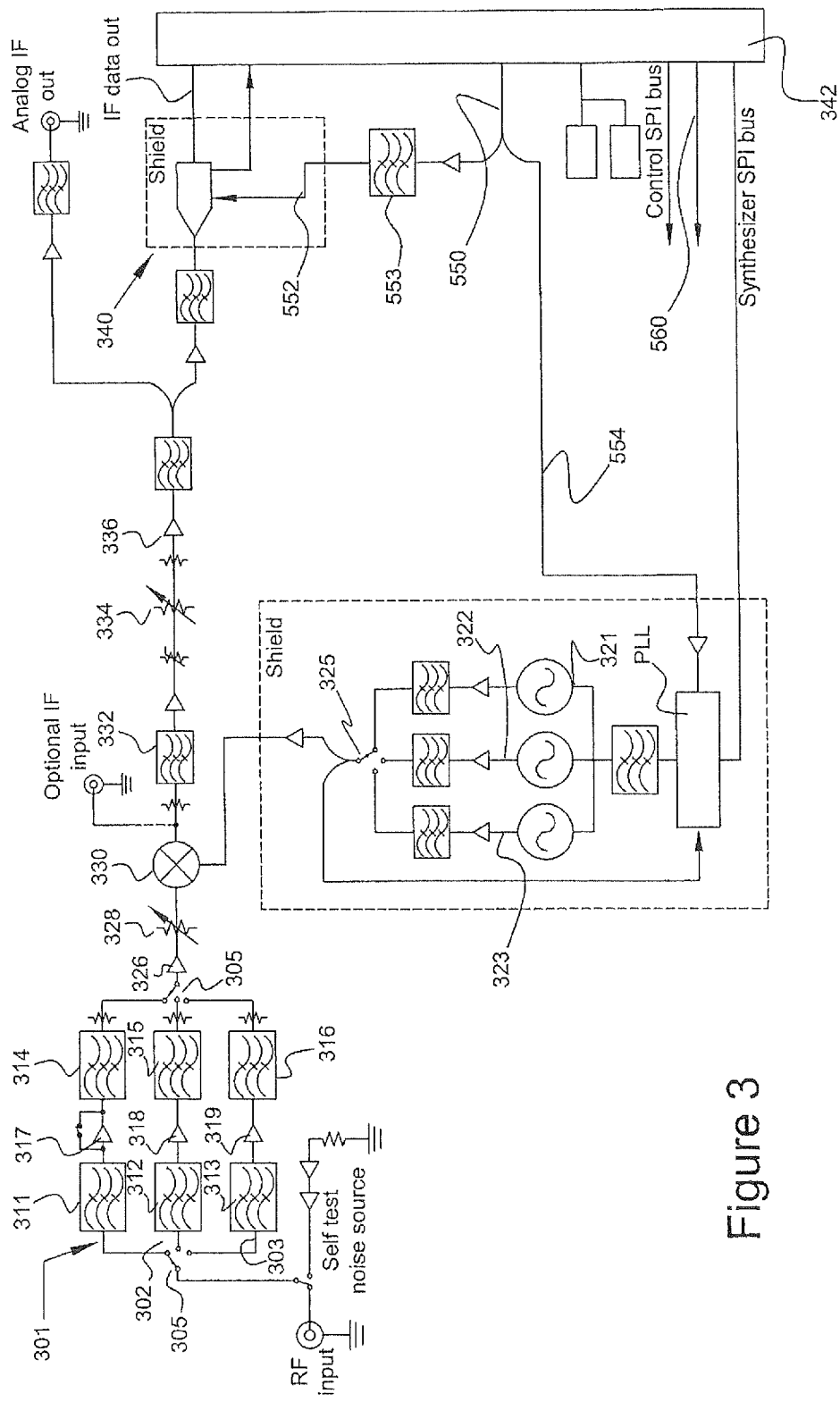
FIG. 3 is a block diagram for a tri-band receiver RF front end according to one embodiment of the present subject matter.

FIG. 3 is a block diagram for a tri-band receiver RF front end 300 according to one embodiment of the present subject matter. With reference to FIG. 3, an exemplary assembly 110 may hold up to two or more RF receiver modules. Each module may be, by way of a non-limiting example, a Triband (800/900 MHz, 1800/1900 MHz, 2100/2100 MHz) receiver, a WiMAX (2.5/3.5 GHz) receiver, or other receiver. Each receiver module may provide independent serial control buses using SPI interfaces and may provide digitized IF signals over a backplane interface to the digital board.

An exemplary RF front end 300 may employ three separate RF paths 301, 302, 303 that are selectable via RF switches 305. In one embodiment of the present subject matter, three North American bands may be simultaneously accommodated. In another embodiment, three European bands may be simultaneously accommodated. Of course, these embodiments are non-limiting as numerous frequency bands (e.g., North American, South American, European, Asian, etc., and combinations thereof) and/or accommodations and the respective hardware configurations are envisioned. Each of these RF paths may include one or more filters 311-316 and amplifiers 317-319.

The RF front end 300 may include three separate voltage control oscillator and synthesizer chains 320, 321, 322 generally utilized to service each band. These chains or loops may be enabled independently when needed via a selectable switch 325. A received RF signal may then be mixed down via a mixer 330 to a predetermined IF level. By way of a non-limiting example, an RF signal that has been amplified and attenuated by an amplifier 326 and digital attenuator 328 may be mixed down to a 249.6 MHz IF where the IF may again be filtered by one or more filters 332, adjusted by one or more attenuators 334 and amplified as necessary by one or more amplifiers 336 prior to being input to an A/D converter 340. From the A/D converter 340, any IF data may be fed to the respective digital back end (not shown) via a high speed connector 342.

Figure 4:
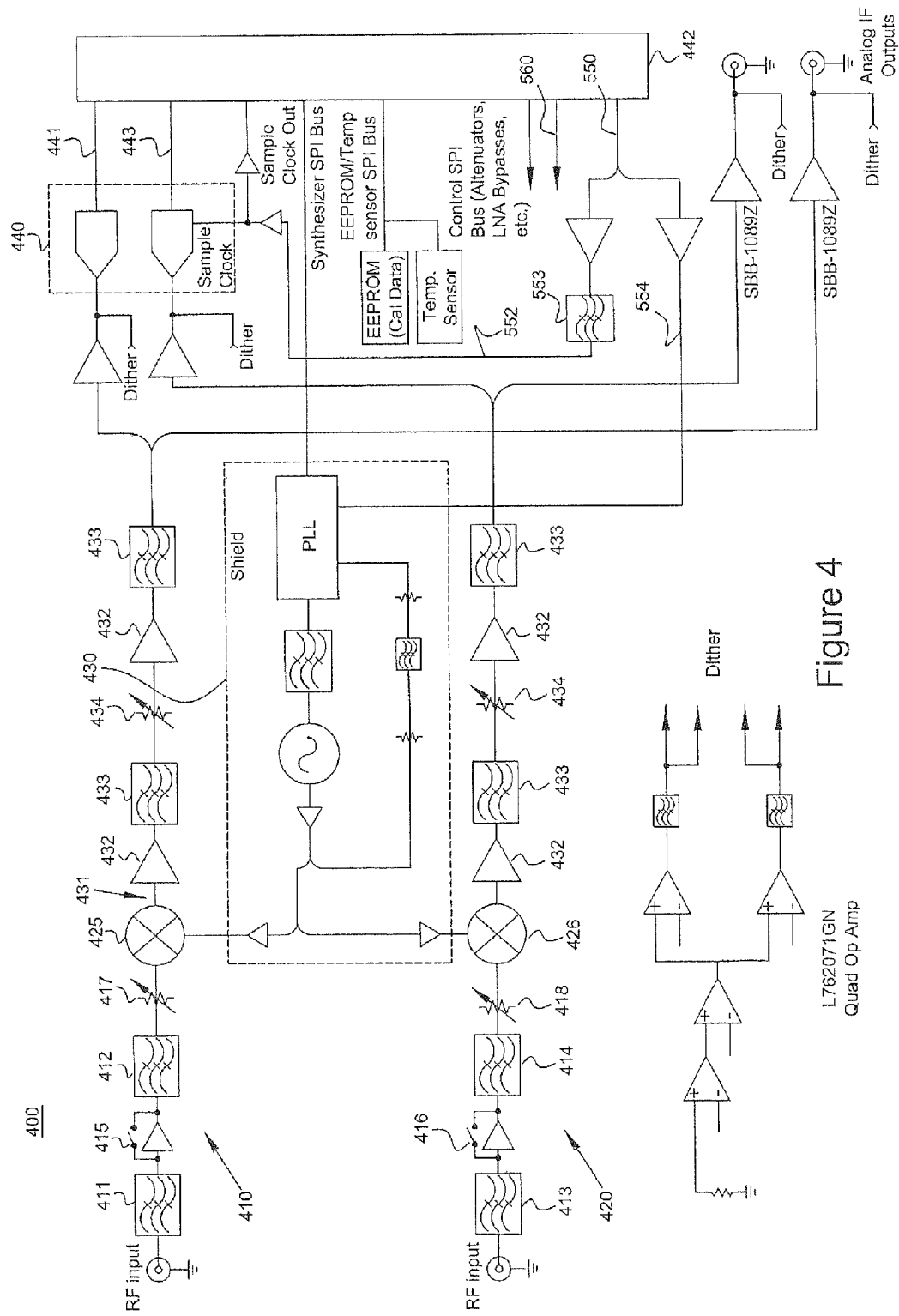
FIG. 4 is an exemplary block diagram for an RF front end for a WiMAX or LTE MIMO receiver according to one embodiment of the present subject matter.

FIG. 4 is an exemplary block diagram for an RF front end for a WiMAX or LTE Multiple Input Multiple Output ("MIMO") receiver according to one embodiment of the present subject matter. With reference to FIG. 4, an exemplary RF front end 400 may share many of the same components used in the tri-band RF front end 300 illustrated in FIG. 3. The embodiment depicted in FIG. 4, provides two duplicate RF feeds 410, 420 to provide diversity MIMO capability. Each RF feed may provide appropriate RF filtering and gain using any suitable amplifying 415-416, filtering 411-414, and attenuating 417-418 devices prior to mixing at respective mixer inputs 425, 426. In this embodiment, a single synthesizer phase locked loop ("PLL") voltage controlled oscillator ("VCO") circuit may provide a low side injection into the mixers 425, 426 to provide a predetermined IF, such as, but not limited to, 325 MHz. The IF signal 431 may then be amplified, filtered and level adjusted by appropriate amplifiers, filters and attenuators 432, 433, 434 prior to being input to an A/D converter, in this embodiment, a dual A/D converter 440. From the A/D converter 440, any IF data may be fed to the respective digital back end (not shown) via a high speed connector 442. Since, in this embodiment, the A/D converter is a dual A/D converter, two separate data busses 441, 443 are output to the digital back end (not shown).

Each of the receiver sections depicted in FIGS. 3 and 4 are configurable. That is, the RF front end may be pluggable or modularized. For example, the embodiment of FIG. 3 illustrates one module having 3 frequency bands. An exemplary IRX may include two (or more) such modules with any number of predetermined frequency bands. Further, each module or receiver may include the capability of conducting a self noise test or calibration check. It should also be noted that in FIGS. 3 and 4, the A/D converter and EEPROM are located on the RF front end or receiver module. Therefore, the A/D converter and any other temperature sensitive component may be located on this configurable and interchangeable module. Further, the EEPROM and any applicable calibration data or information is also located on this configurable and interchangeable module. While not shown in FIG. 4, embodiments of the present subject matter may perform a self test using a noise generator, the self test including temperature, RF frequency, IF frequency, attenuator, filter, etc. testing.

The embodiments of FIGS. 3 and 4 also provide a network operator or engineer the ability to conduct a blind determination or adaptive-learn of the existing signals in a general area. For example, an engineer may utilize an embodiment of the present subject matter and simultaneously search, for example, GSM, CDMA, UMTS, etc. signals for a predetermined frequency band and then determine what type of signal has been received through modulation recognition, envelope recognition, etc. Due to the modular and interchangeable nature of embodiments of the present subject matter, the frequency specific components, e.g., filters, etc., may be changed in the field without having to obtain and calibrate another receiver, return to base, etc. Prior art receivers and methods, however, conduct testing knowing exactly what signals to search.

Figure 5A:
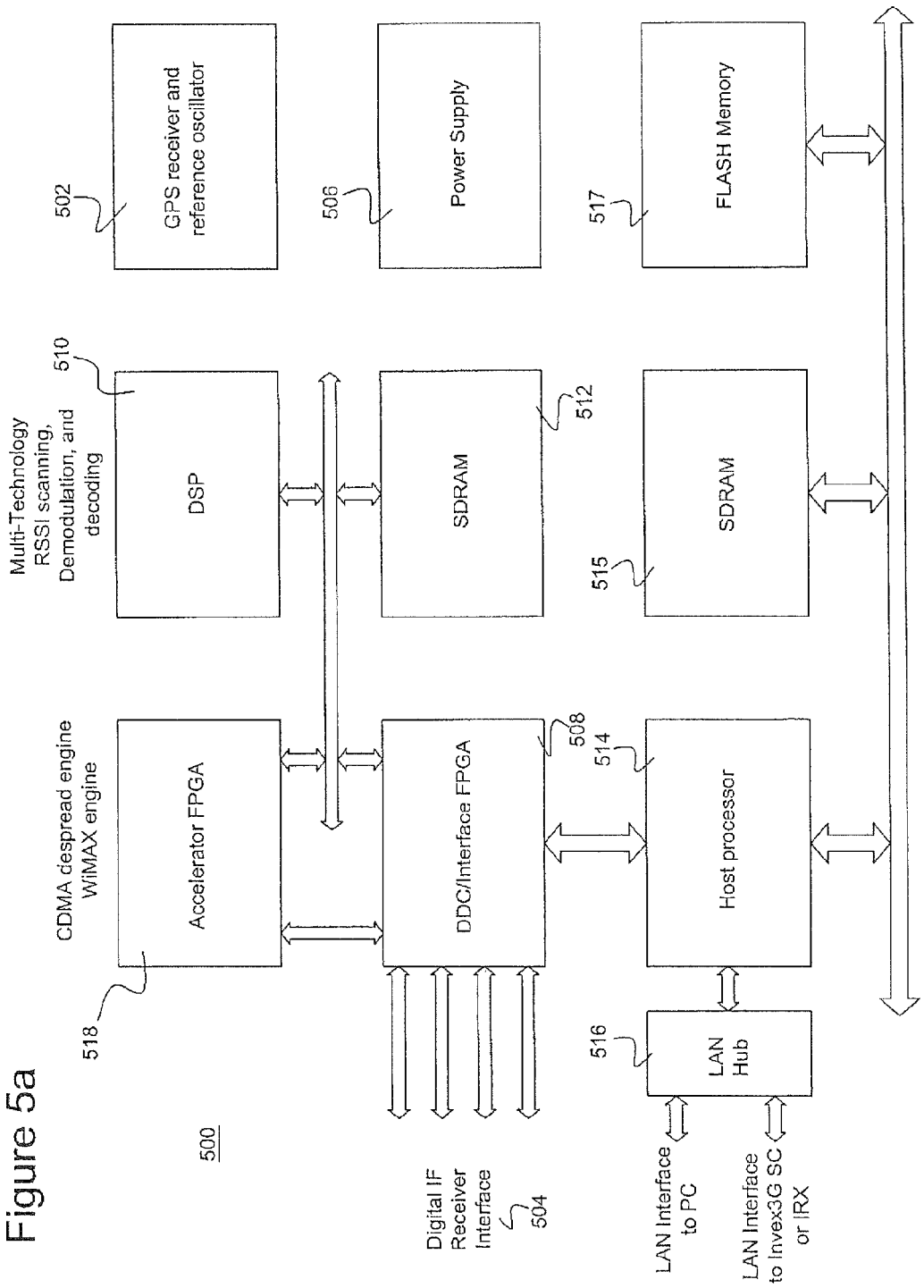
FIG. 5a is a simplified block diagram of an exemplary digital back end according to one embodiment of the present subject matter.

FIG. 5a is a simplified block diagram of an exemplary digital back end according to one embodiment of the present subject matter. With reference to FIG. 5a, an exemplary digital back end 500 may include a main digital board with interfaces to a GPS receiver 502 with or without a reference oscillator module, a digital IF receiver interface 504 via an interconnecting backplane, and a power supply input (e.g., 10-16 VDC) 506. The power section 506 may convert any power supply input to the various core voltages 560 and input/output voltages required for the digital components and receiver modules.

The GPS receiver 502 may provide precise time and date information used to measure absolute timing of received signals (e.g., CDMA signals, etc.) within the IRX. The GPS receiver 502 may also provide a highly stable oscillator (e.g., 76.8 MHz) phase locked to GPS time and may be utilized as a main timing signal 550 (see FIGS. 3 and 4) within the IRX. Clock distribution and level shift functionality may also be provided to split and amplify the reference tone from the GPS receiver 502 to provide a local oscillator reference signal, the converter clocks 552 for A/D converters, and inputs to any phase-locked clock buffers 554. In certain embodiments of the present subject matter, a crystal filter 553 may also be provided to enhance Signal-to-Noise Ratio in the digitization process as will be described later. Using the same GPS synchronized reference may ensure any time of arrival ("TOA") measurements made by an exemplary IRX and all other IRX units deployed in a network possess the same reference. If utilized, a 76.8 MHz clock may require a high degree of spectral purity to minimize spur and noise generation in the mixing and A/D conversion processes. A phase-locked clock buffer may convert the 76.8 MHz tone to several phase aligned square wave clocks used by the respective digital circuitry.

In one embodiment, the IF signal may be digitized to a 16 bit channel for the tri band receiver embodiment. In another embodiment, the IF signal may be digitized to two 14 bit channels for the WiMAX or LTE MIMO receiver embodiment at, for example, 76.8 MSPs. This digitized IF data may then be provided to a DDC/Interface Field Programmable Gate Array ("FPGA") 508 which may act as a third local oscillator to further downconvert the IF signal to baseband in-phase and quadrature phase samples. While not shown, the DDC/Interface FPGA 508 may comprise control signaling and data interfaces between the Interface FPGA and a programmable downconverter ("PDC"). Additional filtering and decimation may be performed to minimize sample rates for fast processing and/or to modify the bandwidth of a received signal as a function of the communications protocol. The interface portion of the FPGA 508 may format the samples and provide for data transfers to a digital signal processor ("DSP") internal and external memory. Further, DSP link ports (not shown) may be included that provide additional data paths between the FPGA 508 and DSP(s) 510 for real-time data transfer and/or communications. An exemplary DSP 510 may be, but is not limited to an Analog Devices TigerSharc, TS201, that works in conjunction with a 4M×64 SDRAM to perform any applicable signal processing. For example, when an exemplary scan operation is preformed, a snapshot of the DDC output is formatted and transferred by the DDC/Interface FPGA 508 to the DSP 510. The DSP 510 may then store the data in its internal and external synchronous dynamic random access memory ("SDRAM") 512 or other suitable memory. When the DSP 510 has enough data, the DSP 510 may process the signal data for RSSI, GSM BSIC, etc., and transfer the results, via the DDC/Interface FPGA 508, to a host processor 514 or computer. The host processor 514 may then transfer this information to an application via a large area network hub 516 and any suitable Ethernet interface (e.g., 10/100 Ethernet interface).

The DDC/Interface FPGA 508 may also provide serial peripheral interfaces to control a respective receiver's functions. For example, the interface portion of FPGA 508 may contain numerous functions including, but not limited to time stamping, host computer interface, direct memory access ("DMA") buffering to the DSP, and may act as a bridge between the host processor 514 and the DSP 510. This exemplary and non-limiting architecture may allow the host processor 514 and DSP 510 buses to run independently and may thus minimize the number of components on each bus to facilitate troubleshooting. Certain embodiments of the present subject matter may also include a second FPGA functioning as an accelerator FPGA 518. This accelerator FPGA 518 may be provided to accelerate WiMAX processing, PN scanning, and scramble code scanning for increased performance over DSP-based processing. When the accelerator FPGA 518 is utilized, the DDC/Interface FPGA 508 may route output samples to the accelerator FPGA 518 and any resulting samples may be routed back to the interface portion of the DDC/Interface FPGA for transfer to the DSP memory 510.

The host processor 514 may generally be responsible for configuration and control of the IRX and may handles communication with network operators, the communication system, etc. In one embodiment, the host processor may, but is not limited to a Freescale Power QUICC II (PQII), with SDRAM 515 and Flash memory 517. Of course, any suitable host processor may be utilized and such an example should not be utilized to limit the scope of the claims appended herewith. The PQII generally provides two cores, one core which is essentially a power PC conducting bulk configuration and control functions for an IRX and upper level communications functions, and a second core acting as a communication controller permitting the PQII to interface with a variety of communication channels using different protocols (serial ports, Ethernet, etc.). Certain embodiments may utilize the Flash memory 517 as a hard drive and this memory 517 may include executables for the host processor 514 and DSP 510, FPGA configuration files, and/or miscellaneous information such as calibration tables, unit serial number, software and hardware revision numbers etc. Additional embodiments may utilize the SDRAM 515 for program execution and data storage.

While not shown, a multi-port fast Ethernet switch may also serve as a hub to enable the host processor 514 to communicate with the IRX, an Invex3G PC, and an additional port for connection to either the Invex3G mainframe or another IRX module within the mainframe. Exemplary digital back ends 500 may thus provide: a split host processor 514 from any number of DSPs 510; a parallel architecture where different tasks may be performed by different processing devices; a static functionality capable of assigning specific tasks to specific machines/devices; and an FPGA adaptable to perform parallel processing.

Figure 5B:
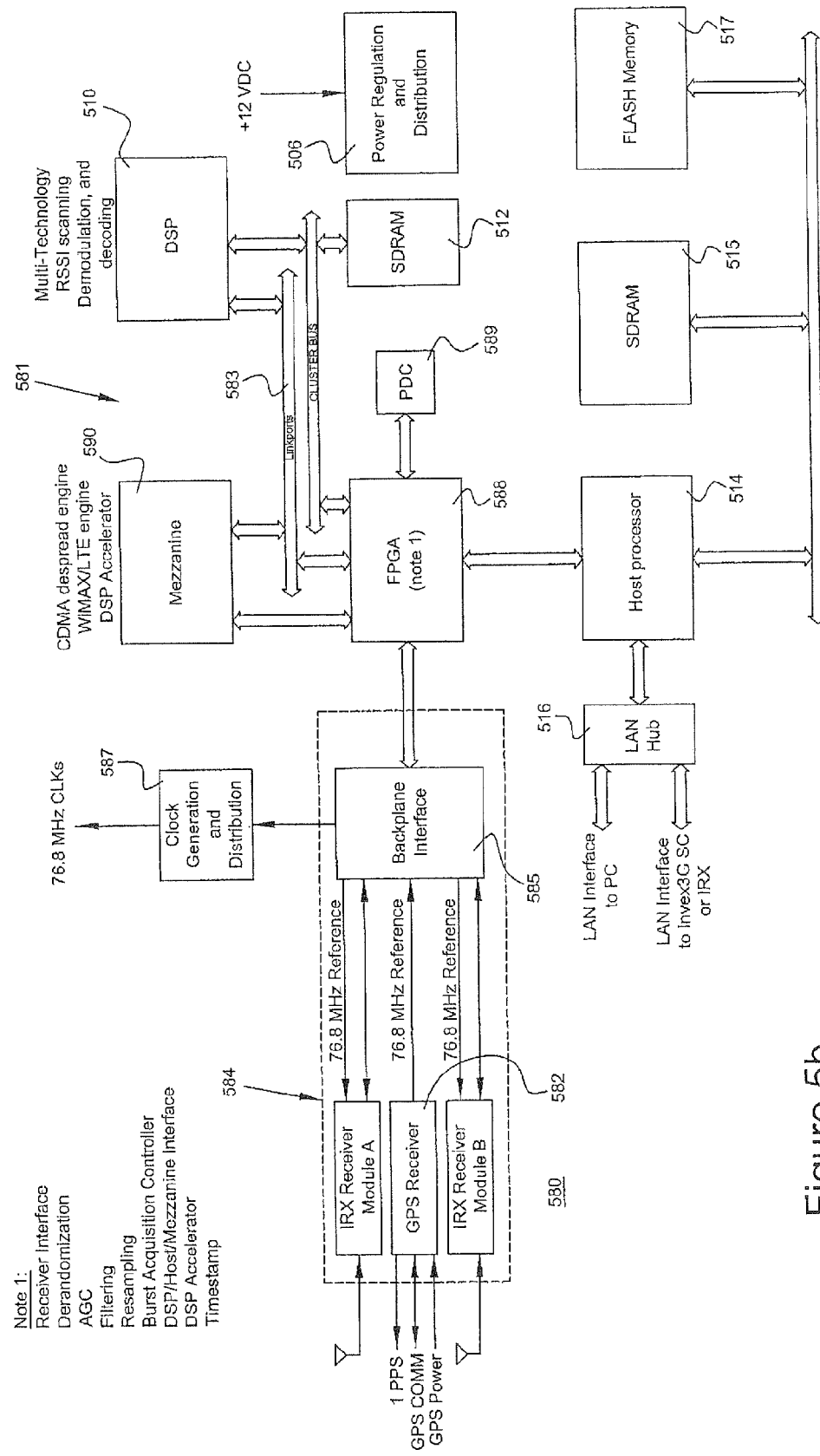
FIG. 5b is another simplified block diagram of an exemplary receiver according to one embodiment of the present subject matter

FIG. 5b is another simplified block diagram of an exemplary receiver according to one embodiment of the present subject matter. With reference to FIG. 5b, an exemplary receiver 580 may include a digital back end 581 with interfaces to a GPS receiver 502, with or without a reference oscillator module, an RF front end 582 via a backplane interface 584, and a power supply input (e.g., 10-16 VDC) 506. The power section 506 may convert any power supply input to the various core voltages 560 and input/output voltages required for the digital components and receiver modules. As discussed above, the GPS receiver 502 may provide precise time and date information used to measure absolute timing of received signals within the receiver or IRX. The GPS receiver 502 may also provide a highly stable oscillator (e.g., 76.8 phase locked to GPS time and may be utilized as a main timing signal 550 (see FIGS. 3 and 4) within the IRX. Clock distribution and level shift functionality 587 may also be provided to split and amplify the reference tone from the GPS receiver 502 to provide a local oscillator reference signal, the converter clocks 552 for A/D converters, and inputs to any phase-locked clock buffers 554. In certain embodiments of the present subject matter, a crystal filter 553 may also be provided to enhance Signal-to-Noise Ratio in the digitization process as will be described later. Using the same GPS synchronized reference may ensure any time of arrival ("TOA") measurements made by an exemplary IRX and all other IRX units deployed in a network possess the same reference. If utilized, a 76.8 MHz clock may require a high degree of spectral purity to minimize spur and noise generation in the mixing and A/D conversion processes. A phase-locked clock buffer may convert the 76.8 MHz tone to several phase aligned square wave clocks used by the respective digital circuitry. The IF signal may be digitized and then be provided to an FPGA 588 which may act as a third local oscillator to further downconvert the IF signal to baseband in-phase and quadrature phase samples. While not shown, the FPGA 588 may provide control signaling and data interfaces between the FPGA 588 and a programmable downconverter ("PDC") 589. Additional filtering and decimation may be performed to minimize sample rates for fast processing and/or to modify the IF signal bandwidth as a function of communications protocol. The interface portion of the FPGA 588 may format the samples and provide for data transfers to a digital signal processor ("DSP") 510 internal and external memory. DSP link ports 583 may provide additional data paths between the FPGA 588 and DSP(s) 510 for real-time data transfer and/or communications. An exemplary DSP 510 may be, but is not limited to an Analog Devices TigerSharc, TS201, that works in conjunction with a 4M×64 SDRAM 512 or any other suitable memory to perform any applicable signal processing. When the DSP 510 has enough data, the DSP 510 may process the signal data for RSSI, GSM BSIC, etc., and transfer the results to a host processor 514 or computer. The host processor 514 may then transfer this information to an application via a large area network hub 516 and any suitable Ethernet interface (e.g., 10/100 Ethernet interface).

With continued reference to FIG. 5b, the FPGA 588 may also provide serial peripheral interfaces to control a respective receiver's functions as briefly described above. Certain embodiments of the present subject matter may also include a Mezzanine 590 to accelerate DSP processing, PN scanning, and scramble code scanning for increased performance over DSP-based processing. The host processor 514 may generally be responsible for configuration and control of the IRX and may handle communication with network operators, the communication system, etc. In one embodiment, the host processor may, but is not limited to a Freescale Power QUICC II (PQII), with SDRAM 515 and Flash memory 517. Of course, any suitable host processor may be utilized and such an example should not be utilized to limit the scope of the claims appended herewith. Certain embodiments may utilize the Flash memory 517 as a hard drive and this memory 517 may include executables for the host processor 514 and DSP 510, FPGA configuration files, and/or miscellaneous information such as calibration tables, unit serial number, software and hardware revision numbers etc. Additional embodiments may utilize the SDRAM 515 for program execution and data storage. While not shown, a multi-port fast Ethernet switch may also serve as a hub to enable the host processor 514 to communicate with the IRX, an Invex3G PC, and an additional port for connection to either the Invex3G mainframe or another IRX module within the mainframe. Exemplary digital back ends 581 may thus provide: a split host processor 514 from any number of DSPs 510; a parallel architecture where different tasks may be performed by different processing devices; a static functionality capable of assigning specific tasks to specific machines/devices; and an FPGA adaptable to perform parallel processing.

Figure 5C:
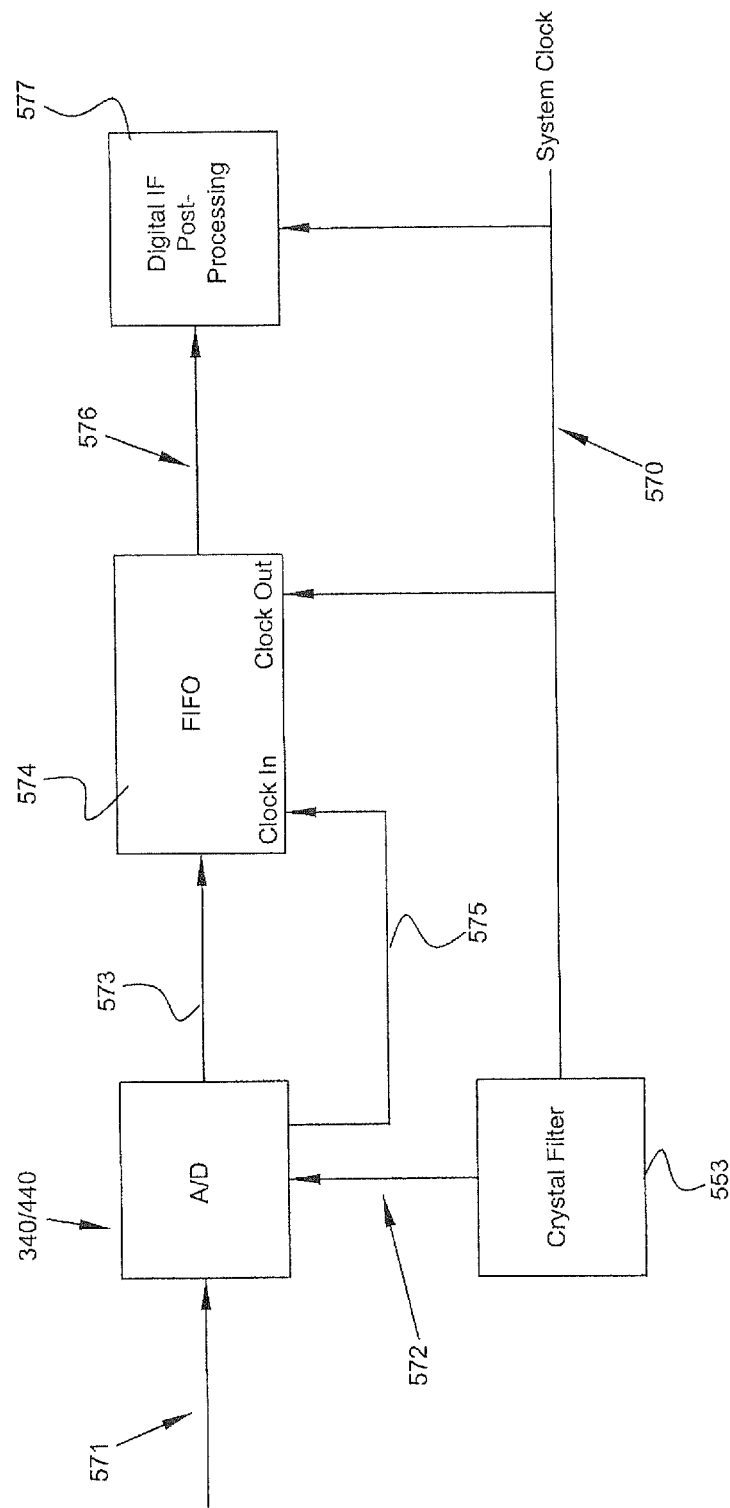
FIG. 5c is a simplified clock phase-correction block diagram according to an embodiment of the present subject matter.

FIG. 5c is a simplified clock phase-correction block diagram according to an embodiment of the present subject matter. With reference to FIG. 5c and continued reference to FIGS. 3 and 4, one embodiment of the present subject matter may incorporate an RF down-converter using a local oscillator driven from a clock reference 570. The clock reference 570 may be derived and synchronized by a GPS receiver to provide a highly-stable clock reference. The clock reference 570 may also be provided to the A/D converter 340/440 which digitizes an analog IF bandpass signal 571 in an oversampling implementation. The clock reference 570 may, however, provide phase noise which may ultimately result in clock jitter in the A/D converter 340/440. A crystal filter 553 may be utilized in embodiments of the presents subject matter to suppress side-lobe energy and harmonic signal content on the clock reference 570 to source the A/D converters 340/440 thereby resulting in a well-filtered, narrowband, low-jitter clock reference signal 572. The resulting group delay variation of the crystal filter 553 may also be compensated in a synchronous digitally clocked system within embodiments of the present subject matter. An adaptive clock-phase correction may be applied to an uncompensated digital IF signal 573 by use of a dual-clocked First In First Out ("FIFO") circuit 574 within an FPGA. The input clock of the FIFO 574 may be an A/D clock 575 or an A/D strobe out clock. The FIFO output clock may be the system clock signal 570 used in digital signal post-processing. The FIFO 574 may thus act as an elastic buffer to provide a synchronously clocked digital IF signal 576 for post-processing circuitry 577 while absorbing any clock phase variations induced by the crystal filter 553 as a function of, for example, temperature, aging, etc. In one embodiment, an 8-deep FIFO may be utilized to short-term +/−4 clock sample variability. Of course, such a FIFO is exemplary only and should not limit the scope of the claims appended herewith. Such techniques may be adaptive between down-converter modules which are interchangeable in the field. Further, no digital calibration is necessary in that the FIFO dual-clocking capability provides self-adjusting and correcting for various group delay variations between crystal filters in different down-converters.

Figure 6:
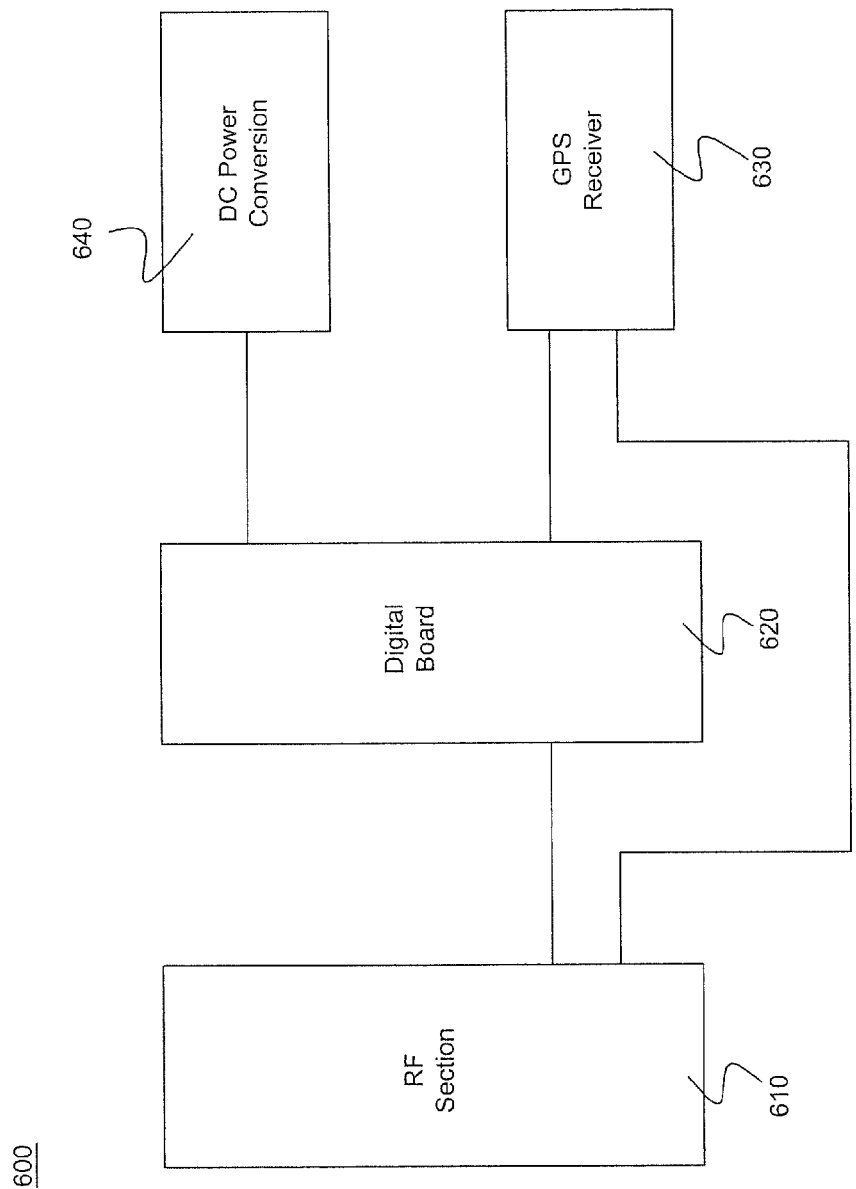
FIG. 6 is a simplified block diagram of hardware present in one embodiment of the present subject matter.

FIG. 6 is a simplified block diagram of hardware present in one embodiment of the present subject matter. With reference to FIG. 6, hardware in an exemplary IRX 600 may include an RF section 610, digital board 620, a GPS receiver 630, and a DC power conversion section 640. The RF section 610 may include a single receiver module or multiple receiver modules with one or more A/D converters and a calibration source. The GPS receiver 630 may include an exemplary timing reference, e.g., 76.8 MHz timing reference, utilized by the RF section 610 and the digital board 620. Of course, the timing reference provided is exemplary only and should not limit the scope of the claims appended herewith. The GPS receiver 630 may be controllable and may provide time-of day and status information via an appropriate interface to a host processor. Generally, the digital board 620 may provide baseband hardware signal processing functions as well as embedded system control or host processor functions for the IRX 600.

Figure 7A:
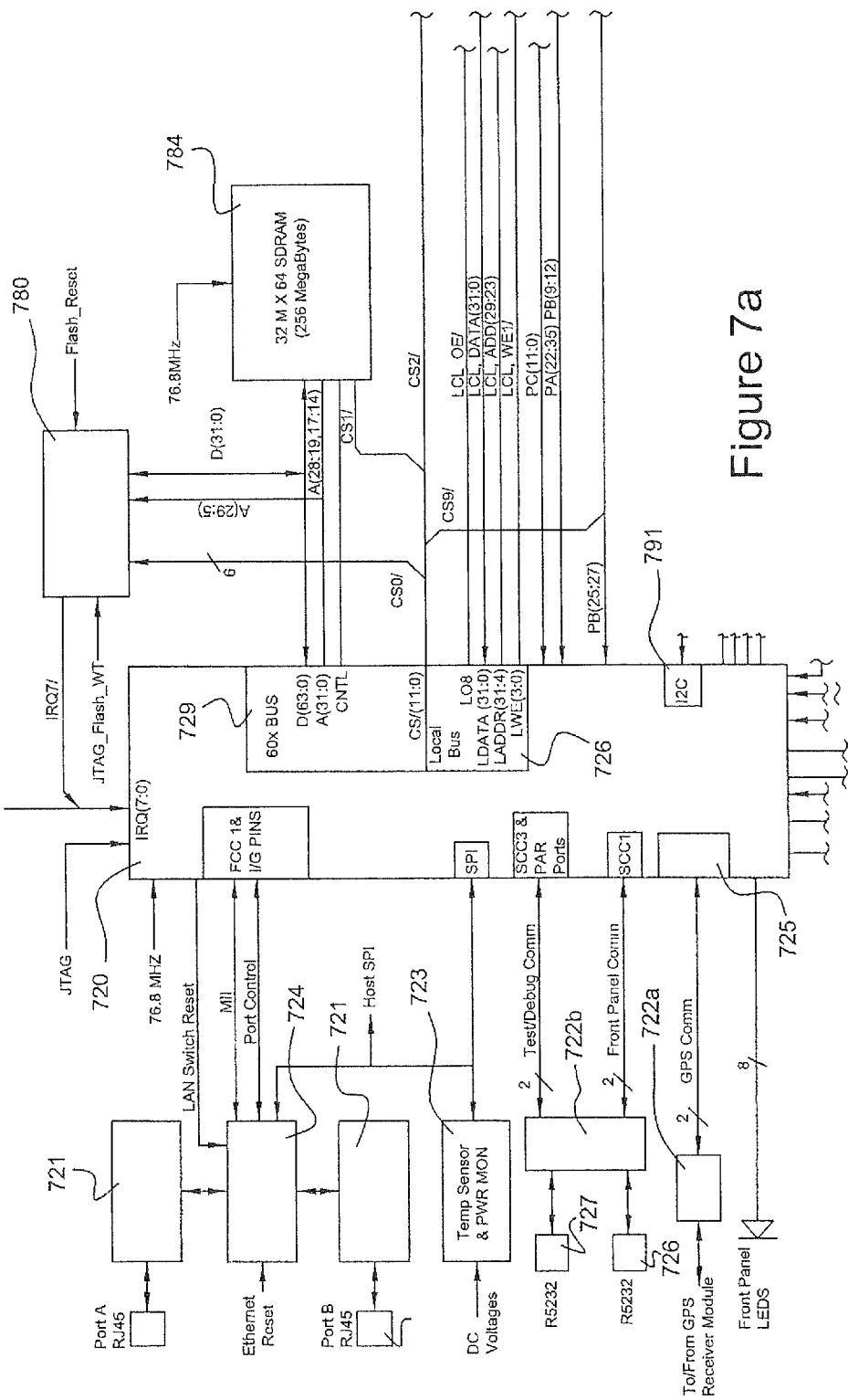
FIGS. 7a-7c are block diagrams of a digital board according to one embodiment of the present subject matter.
Figure 7B:
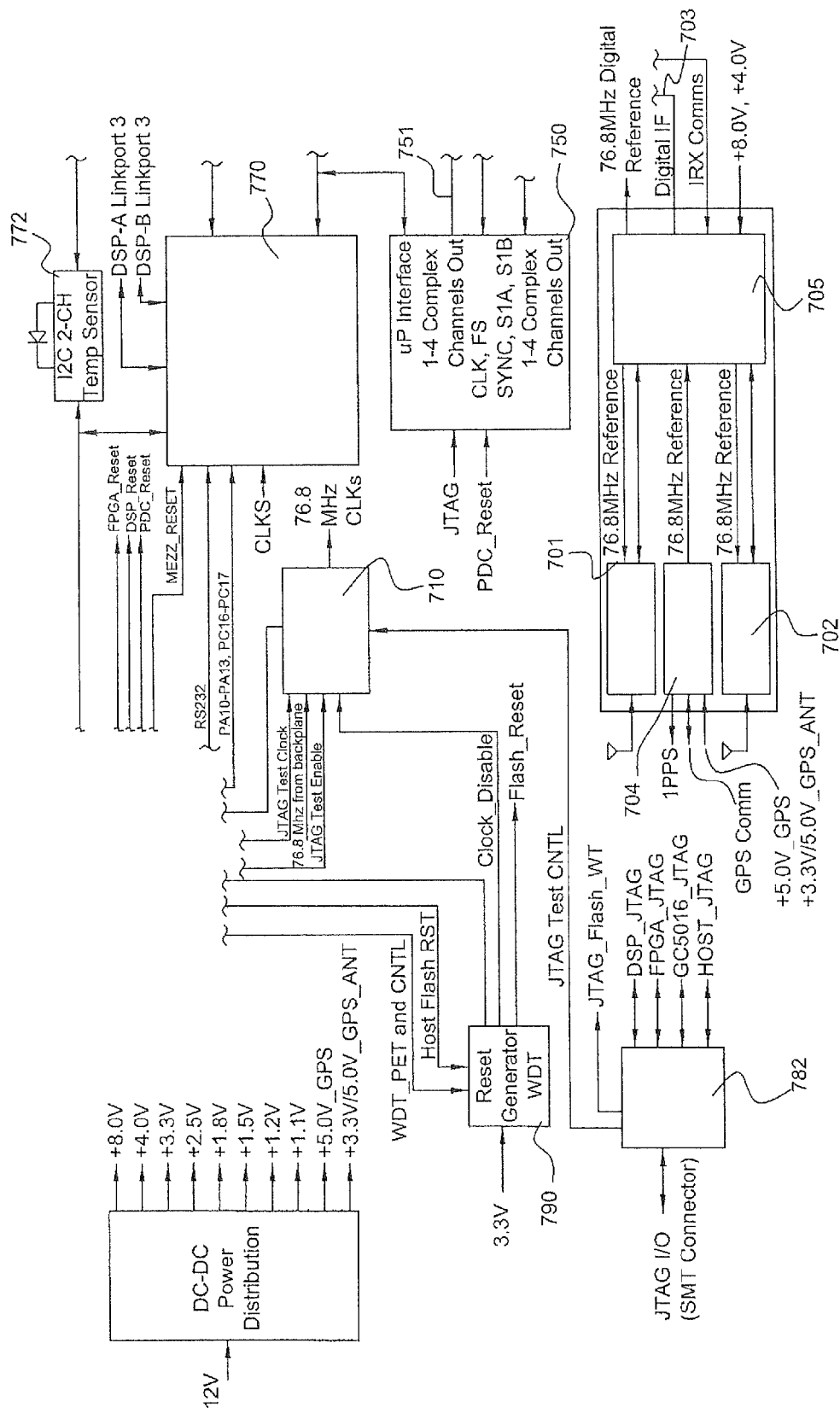
Figure 7C:
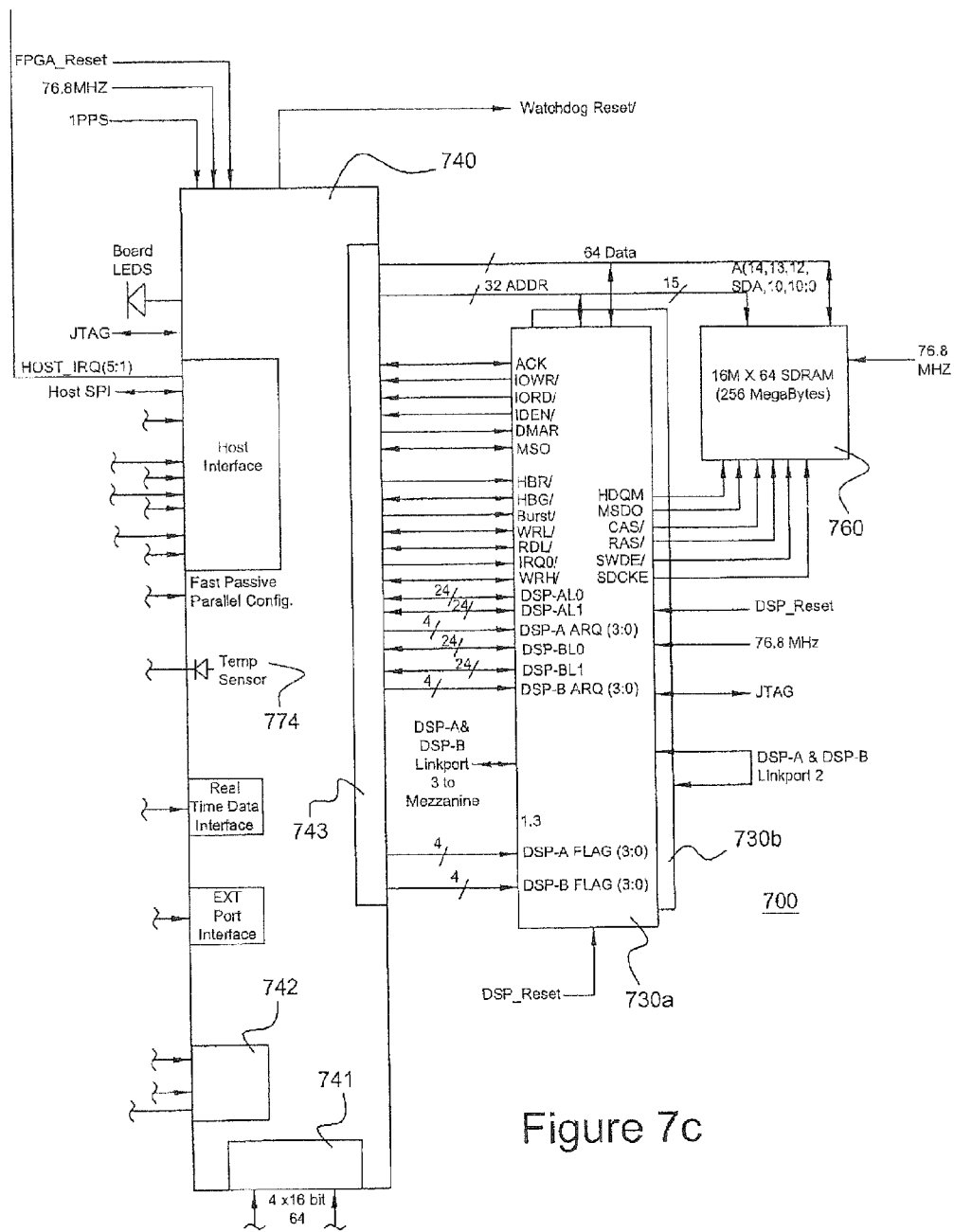

FIGS. 7a-7c are block diagrams of a digital board according to one embodiment of the present subject matter. With reference to FIGS. 7a-7c, an exemplary digital board 700 may include a clock generator 710, a host processor 720, one or more DSPs (two are shown in this embodiment) 730a, 730b, an interface FPGA 740, and a four-channel programmable downconverter ("PDC") 750. The described embodiment may also receive signals from one or more RF receiver modules 701, 702 and a GPS receiver 704.

The digital board 700 may process multiple simultaneous IF channels provided via a backplane interface 705 from the RF receiver modules 701, 702 and previously described. In FIGS. 7a-7c, the illustrated embodiment is adaptable to process up to four simultaneous 249.6 MHz IF channels 703; of course, this embodiment is exemplary only and should not limit the scope of the claims appended herewith. Each channel may be digitized, for example, up to 16 bits of resolution at 76.8 Msamples/second. The digitized signal from each IF channel may be received by a receiver interface 741 in the interface FPGA 740 and filtered, translated to baseband and decimated via either the FPGA 740 or, in another embodiment in the PDC 750. IF signal bandwidth may be modified after digitization via tuning and filtering within the FPGA 740 or by routing the IF signal to the PDC 750 and back and out to memory devices for the DSPs 730a, 730b. Link port interfaces to the DSPs 730a, 730b may also be utilized for fast communication and/or data exchanges between the FPGA 740 and DSPs 730a, 730b. Channels in the downconverter 750 may also be synchronized such that the decimated output streams 751 for the channels are synchronized in time to the GPS when received by the FPGA 740 via a PDC interface 742. Snapshots of the resultant decimated data streams may be stored in an exemplary SDRAM 760. These data snapshots may be provided to the DSP 730a via a DSP interface 743 and processed by the DSP 730a or, in another embodiment, by mezzanine-based hardware 770. Processing results may be passed, via the Interface FPGA 740, to the host processor 720 for transmission to equipment external to the IRX.

The DSP software, the host processor software, PDC configurations and/or FPGA configurations may be stored in Flash memory 780 on the digital board 700 along with other parameters such as, but not limited to, calibration tables, board and unit serial numbers, software revisions, etc. The host processor 720 may be capable of downloading the DSP software, the PDC configurations and/or FPGA configurations and may also be capable of configuring the PDC 750. In one embodiment, the host processor 720 may run or operate an operating system common to all IRX host applications. In one non-limiting embodiment of the present subject matter, the operating system may be a PSOS operating system. The host processor 720 may function as the IRX controller and provide communications between the IRX and network operators, the communications network, etc. The host processor 720 may also provide a 10 BaseT Ethernet link 721 for maintenance and factory test and other purposes. The host processor 720 may also provide one or more serial ports 722a, 722b, e.g., RS232 serial ports. One of the serial ports 722a may be utilized for GPS control and monitoring. Another of the serial ports 722b may be available for maintenance and testing. The host processor 720 may also monitor unit temperatures and power supply status via a temperature sensor and power monitor 723. As a controller, the host processor 720 may configure and manage the IRX in accordance with tasking and control information provided to an Ethernet port via an exemplary Ethernet switch 724, such as, but not limited to a BCM5325 10/100 Base-T/TX 5/6 Port Switch.

The interface FPGA 740 may provide a bridge between the host processor 720, the DSPs 730a, 730b, the mezzanine 770, and/or the PDC 750 depending upon the specific embodiment. The interface FPGA 740 may include numerous memory mapped peripherals that are substantially resident on the DSP cluster bus. For example, the FPGA 740 may provide a hardware watchdog timer that, when enabled, may reset the digital board 700 if the host processor 720 or the DSP(s) 730a, 730b do not respond to it on a regular basis. The interface FPGA 740 may also provide a real time clock ("RTC") function that time tags the first sample of each snapshot of PDC data to a predetermined resolution, such as, but not limited to, ≤1/76.8e6 seconds. This time tag may be available to the host processor 720 and/or the DSP(s) 730a, 730b; the time tag may also be synchronized to GPS time by using a signal such as, but not limited to, a GPS_1PPS signal and/or a clock generator signal that may be synchronized to GPS time. The interface FPGA 740 may also incorporate an overflow detector for each IF channel. For example, an exemplary FPGA 740 may count the number of times that the 5 most significant bits ("MSB") of each A/D converter in the respective channel exceeds an individually programmable threshold and make these results available to the host processor 720 and the DSP(s) 730a, 730b. The interface FPGA 740 may also buffer any data from the PDC 750 and transfer the PDC data in blocks to the SDRAM 760, via the DSP(s) 730a, 730b on a DSP cluster bus. The interface FPGA 740 may also provide parallel to serial converters to permit a transfer of control and/or set-up information to the RF downconverters via a serial bit stream. Generally, this is conducted because some RF receivers may have only serial interfaces; further, the serial interface may reduce the number of signal lines entering the RF section from the digital side to thereby reduce any digital noise transferred to sensitive RF circuitry. In another embodiment of the present subject matter, one or more Joint Test Action Group ("JTAG") ports 782 may be utilized to facilitate test and debug operations in the development, manufacture, and maintenance phases of embodiments of the present subject matter. These ports 782 may also be utilized for Flash memory 780 programming.

In embodiments of the present subject matter, there may be numerous hardware and software interfaces, for example, between the DSPs 730a, 730b, the host processor 720, interface FPGA 740 and/or other hardware. Regarding bit numbering between the host processor 720 and the DSPs 730a, 730b, in one embodiment, for example, a host processor 720 may define a lowest number bit as the MSB while the DSP 730a defines the highest numbered bit as the MSB. In this case, the FPGA 740 would perform a conversion between these two formats on transfers between the DSP cluster bus and the host processor local bus.

During system reset and initialization of embodiments of the present subject matter, e.g., a power interruption, hardware watchdog timeout, watchdog timeout in the interface FPGA, etc., a power on reset module may issue a reset that holds the digital section reset until the power supply and the clocks have stabilized. Once the reset module times out, the Flash memory 780 followed by the host processor 720 are released from reset. The Flash memory 780 may in one embodiment release from reset first and may be in asynchronous page read mode. The host processor 720 may then power-up, as a configuration master, in a "single-8270 bus" mode. The host processor 720 may then conduct an EPROM boot by reading a "hard configuration word" from any number of locations in the Flash memory 780. For example, the hard reset configuration word may be read from locations 0, 0x8, 0x10 and/or 0x18. The reset vector may then be mapped above this at 0x100; when the reset vector is mapped to "low mem" it may not interfere with the hard reset configuration word.

Pull-down resistors (not shown) may be provided on host processor reset lines to hold the DSPs 730*a*, 730*b*, the interface FPGA 740, the Ethernet interfaces, the Mezzanine 770, and the PDC 750 in reset. After booting, the host processor 720 may then bring the Ethernet PHY device out of reset by asserting I/O pin PB16. The processor 720 should then release and configure the interface FPGA 740. Finally, the DSPs 730*a*, 730*b* should be booted, and the PDC 750 released from reset. Exemplary and non-limiting reset signals for the various devices are as listed below in Table 1. It should be noted that the information contained in Table 1 is exemplary only and should not in any way limit the scope of the claims appended herewith.

TABLE 1

| Device | Host Pin | Comment |
| --- | --- | --- |
| Host processor | PORESET | Other resents are wired to JTAG Port only |

The host processor 720 may be booted using the Flash memory 780 resident on its respective 60x bus. This Flash memory 780 may include, for example, a host application, a DSP application, interface FPGA configuration data, calibration data, manufacturing serialization data, hard configuration word, and/or any other information required to configure the board.

An exemplary Flash memory 780 may comprise, in one non-limiting embodiment, a series of 64K blocks adaptable to be locked and unlocked via hardware and software. These blocks may power-up in the locked state to preclude accidental loss of data. Boot software may also be loaded using the JTAG port of the host processor 720. The respective boot code may generally permit application software to be downloaded via the Ethernet or a WAN, if not already resident in the Flash memory 780.

Upon system initialization, some resources may be inaccessible until the interface FPGA 740 has been programmed. Therefore, one of the first tasks of the host processor 720 may be to download a configuration file to the FPGA 740 to program the FPGA 740. This may be accomplished using any one or several configuration pins listed below in Table 2. Details of respective programming may be described in the respective FPGA data sheet. By way of a non-limiting example, an exemplary FPGA may be the Altera Stratix III, and the information listed in Table 2 is reflective thereof. It should be noted that the information contained in Table 2 is exemplary only and should not in any way limit the scope of the claims appended herewith.

TABLE 2

| Altera interface FPGA Programming Signal | Host Pin |
| --- | --- |
| Status/ | PB25 |
| CONF_DONE | PB27 |
| CONFIG | PB26 |
| DCLK | CS9/ |
| DATA0..7 | LDATA[31..24] LSB of local bus |

The DSPs 730*a*, 730*b* may be booted in host mode using either autoDMA channel. An exemplary procedure may utilize 256, 32 bit word to be written to the selected autoDMA channel. Exemplary transfers may be single or multiple word transfers. The system will power-up with the DSP reset, and the host processor 720 may hold the DSP reset until the host processor 720 is ready to boot the DSPs 730*a*, 730*b* by pulling I/O pin PB17 to the logic 0 state. When the host processor 720 is ready to boot the DSPs 730*a*, 730*b*, the host processor 720 should set PB17 to a logic 1. An exemplary and non-limiting DSP booting procedure is described in Analog Devices' engineer to engineer APP note 200.

As previously mentioned, the host processor 720 may interface with a 10 BaseT Ethernet port(s) 721 for test, factory configuration, factory test and/or field maintenance and test. These interface generally employ FCC1 on the host processor 720 in a Media Independent Interface ("Mu") mode). A physical layer ("PHY") device may be provided within the Ethernet switch 724, such as, but not limited to a BCM5325 10/100 Base-T/TX 5/6 Port Switch, using a Reverse MIT interface. The non-limiting example of a BCM5325 provides two additional ports for interface to either the PC or network and a second device such as another IRX scanner or another system controller. A magnetic data input output ("MDIO") interface may be utilized to selectively control and configure part and hardware configurations. The respective MDIO clock rate should generally be set to less than 1 MHz (e.g., should not run unless configuring the part). Connection points for the respective interfaces are provided below in Table 3 and management interfaces are provided below in Table 4. It should be noted that the information contained in Table 3 and 4 is exemplary only and should not in any way limit the scope of the claims appended herewith.

TABLE 3

| Media Independent Interface Pin | Host I/O port pin |
| --- | --- |
| TX Data 3 | PA21 (RxD3) |
| TX Data 2 | PA20 (RxD2) |
| TX Data 1 | PA19 (RxD1) |
| TX Data 0 | PA18 (RxD0) |
| RX Data 3 | PA14 (TxD3) |
| RX Data 2 | PA15 (TxD2) |
| RX Data 1 | PA16 (TxD1) |
| RX Data 0 | PA17 (TxD0) |
| TX_EN | PA28 (RxDV) |
| TXCLK | PC23 |
| TX_ERROR | PA29 (N/C) |
| RX DATA VALID | PA27 (Tied to RxEN) |
| RX ERROR | PA26 (pulled low) |
| RX CLK | PC20 |
| COLLISION | PA31 (pulled low) |
| CARRIER SENSE | PA30 (Tied to TxEN) |

TABLE 4

| Management Interface Pin | Host I/O pin |
| --- | --- |
| MGT DATA CLOCK | PC13 (bit bang) |
| MGT DATA I/O | PC14 |
| MGT DATA INTR/ | PC12 (pulled high) |

The host processor 720 may also handle RS232 control and time interface with the GPS receiver 704. An exemplary interface may employ the host processor's SMC2 port 725. Interface details are available in the latest GPS documentation and may be wired as a data terminal equipment ("DTE"). Connection points are provided below in Table 5. It should be noted that the information contained in Table 5 is exemplary only and should not in any way limit the scope of the claims appended herewith.

TABLE 5

| RS232 signal | Host I/O port |
| --- | --- |
| RXD | PA8 |
| TXD | PC15 |

The host processor 720 may be in communication with a front panel mounted RS232 port 726 that employs Host Serial Communication Controller one ("SCC1"). RTS/ and CTS/ handshake signals may be utilized to permit hardware flow control if desired and the respective interface may also be wired as a DTE. Connection points are provided below in Table 6. It should be noted that the information contained in Table 6 is exemplary only and should not in any way limit the scope of the claims appended herewith.

TABLE 6

| RS232 signal | Host I/O port |
| --- | --- |
| CTS/ | PC29 |
| RTS/ | PD29 |
| RXD | PD31 |
| TXD | PB28 |

Another RS232 port 727 may be utilized for test and debugging purposes and may be provided from the host processor 720 for hardware/software development. An exemplary interface may utilize RXD and TXD and may be pinned out on a connector accessible on the digital board. Connection points are provided below in Table 7. It should be noted that the information contained in Table 7 is exemplary only and should not in any way limit the scope of the claims appended herewith.

TABLE 7

| RS232 signal | Host I/O port |
| --- | --- |
| RXD | PD22 |
| TXD | PD21 |

Yet another RS232 port 728 may be provided from the processor 720 to/from the Mezzanine 770. This interface 728 may utilize, in one embodiment, SMC1 and BRG7 and the respective interface may also be wired as a DTE. Connection points are provided below in Table 8. The host processor 720 may also communicate directly with the Mezzanine 770 via multiple I/O pins and a dedicated Mezzanine reset line. Connection points for this embodiment are provided below in Table 9. It should be noted that the information contained in Tables 8 and 9 is exemplary only and should not in any way limit the scope of the claims appended herewith.

TABLE 8

| RS232 signal | Host I/O port |
| --- | --- |
| RXD | PD8 |
| TXD | PD9 |

TABLE 9

| Signal | Host I/O port |
| --- | --- |
| Host_to_Mezzanine_Spare0 | PA10 |
| Host_to_Mezzanine_Spare1 | PA11 |
| Host_to_Mezzanine_Spare2 | PA12 |
| Host_to_Mezzanine_Spare3 | PA13 |
| Mezzanine_to_Host_Spare0 | PC16 |
| Mezzanine_to_Host_Spare1 | PC17 |
| /Mezzanine_Reset | PB20, active low signaling 0 = reset, 1 = normal operation |

An exemplary host processor 720 may control number SPI devices on the digital board. For example, the host processor 720 may control the Ethernet switch 724 (e.g., BCM5325E LAN Switch), a main board A/D converter (dc supply readings), primary board temperature sensor, and/or the temperature sensors and EEPROMs resident on any one or several of the receivers 701, 702, to name a few. Table 10 provides a summary of non-limiting exemplary SPI devices and connections thereto. It should be noted that the information contained in Table 10 is exemplary only and should not in any way limit the scope of the claims appended herewith.

TABLE 10

| Device | Host I/O pin(s) |
| --- | --- |
| Broadcomm BCM5325E LAN Switch | PD12 SW (BCM5325E) SPI Enable/ |
| Main digital board A/D (power status) | PD10 PS_AD_MUX0 PD11 PS_AD_MUX1 PD13_PS_AD_CS/ |
| Main digital board (primary) temperature sensor | PD19 TEMP_SEN_CS/ |
| Receiver #1 Temperature Sensor | PD23 RX1_TEMP_CSn |
| Receiver #1 EEPROM | PD24 RX1_EEPROM_CSn |
| Receiver #2 Temperature Sensor | PD25 RX2_TEMP_CSn |
| Receiver #2 EEPROM | PD26 RX2_EEPROM_CSn |

DC supply rails in embodiments of the present subject matter may be A/D converted to 10 bits of resolution using an 8 input channel A/D converter. In the event that there are more than 8 supply rails, an analog mux may be attached to ports 6 and 7 of the A/D to permit additional rails to be converted. The host processor 720 may select which supply rail the processor wants to monitor, initiate the conversion of the supply voltage level, and read the results of the conversion back via the SPI bus and two I/O pins. The two I/O pins (in this example, PD11 and PD10) may provide a selectable input for the mux. This process may require a three byte transaction on the SPI bus as indicated in Tables 11-13. Table 11 indicates the bytes that may be transmitted by the host processor 720 with the left most bit being the first bit of the first byte. Table 12 shows the result returned by the A/D converter, and Table 13 shows the function of the bits and the expected results. Of course, the information contained in Tables 11-13 is exemplary only and should not in any way limit the scope of the claims appended herewith.

TABLE 11

| SP_MISO (Host processor output to the A/D converter) |
|---|
| 0 0 0 0 0 0 0 1 1 D2 D1 D0 X X X X X X X X X X X X |

TABLE 12

| SP_MISO (A/D response to the host processor) |
|---|
| 1 1 1 1 1 1 1 1 1 1 1 1 1 0 BIT 9 MSB 8 7 6 5 4 3 2 1 BIT 0 LSB |

TABLE 13

| Supply to Monitor | D2 | D1 | D0 | PD11 | PD10 | Min Value (dec) | Max Value (dec) |
|---|---|---|---|---|---|---|---|
| 1.525 V_PQII_CORE | 0 | 0 | 0 | X | X | 588 | 661 |
| 1.0 V_SHARC_CORE (500 MHz) | 0 | 0 | 1 | X | X | 385 | 435 |
| 1.25 V_SHARC_CORE (600 MHz) | 0 | 0 | 1 | X | X | 462 | 522 |
| 1.5 V_SHARC_DRAM | 0 | 1 | 0 | X | X | 578 | 650 |
| 2.5 V_SHARC_IO | 0 | 1 | 1 | X | X | 476 | 548 |
| 1.5 V_ALTERRA_CORE | 1 | 0 | 0 | X | X | 578 | 650 |
| 1.8 V_PDC | 1 | 0 | 1 | X | X | 700 | 779 |
| 3.3 V | 1 | 1 | 0 | 0 | 0 | 628 | 710 |
| 6.4 V | 1 | 1 | 0 | 1 | 0 | 606 | 684 |
| 12 V | 1 | 1 | 1 | 0 | 0 | 573 | 659 |
| +5 V_GPS | 1 | 1 | 0 | 1 | 1 | 635 | 730 |
| +1.8 V FLASH | 1 | 1 | 1 | 0 | 1 | 700 | 779 |
| +VANT | 1 | 1 | 1 | 1 | 1 | 626(5 V LNA) 417(3.3 V LNA) | 766(5 V LNA) 511(3.3 V LNA) |

The respective SPI mode register may be configured to make it the host, single master with the CP and the CI bits both equal to logic ones. PM[3.0] may be set to 15 to minimize the clock rate, and if the clock cannot be divided down far enough, this interface may be bit banged. I/O pin PD13 may be the low active chip select for the A/D converter. To initiate a conversion, a mux may select PD11 and PD10 to be set to the state in the table for the desired voltage and I/O Pin 13 should be appropriately set to logic 0. These pins should generally be in the desired state for approximately 100 ns prior to enabling the clock. At the conclusion of a conversion, PD 13 should be set to a logic 1 for approximately 270 ns prior to the start of another conversion. To avoid bus collisions between devices on the SPI bus, only one SPI port peripheral chip select should be asserted at a time.

Embodiments of the present subject matter may include a primary board temperature sensor, such as, but not limited to an AD7814. This sensor may be connected as shown in Table 14 below using the SPI feature of the host processor 720. The sensor may provide a temperature reading in twos compliment format with 0.25 degree C. resolution thereby providing a range in excess of the operating temperature range of the chip. The temperature word format is shown below in Table 15 with T9 being the MSB. The device may include a power down function accomplished by writing the word shown below in Table 16. Of course, the information contained in Tables 14-16 is exemplary only and should not in any way limit the scope of the claims appended herewith.

TABLE 14

| Bit 15 | | | | | | | | | | | | | | | Bit 0 |
|---|---|---|---|---|---|---|---|---|---|---|---|---|---|---|---|
| 0 | T9 | T8 | T7 | T6 | T5 | T4 | T3 | T2 | T1 | T0 | T0 | T0 | T0 | T0 | T0 |

TABLE 15

| Bit 15 | | | | | | | | | | | | | | | Bit 0 |
|---|---|---|---|---|---|---|---|---|---|---|---|---|---|---|---|
| X | X | 1 = pwrdwn 0 = normal | 0 | 0 | 0 | 0 | 0 | 0 | 0 | 0 | 0 | 0 | 0 | 0 | 0 |

TABLE 16

| Temp sensor I/O | Host I/O |
|---|---|
| SCLK | PD18 |
| DIN | PD17 |
| DOUT | PD16 |
| CS/ | PD19 |

The SPI mode register may also be configured in another embodiment to make it the host, single master with the CP and the CI bits both equal to logic ones. The transfer may be accomplished as one 16 bit or two 8 bit transfers. PM[3.0] should generally be set for 15 to minimize the clock rate to be compatible with the power supply A/D monitor also on the bus. To avoid bus collisions between devices on the SPI bus, generally one SPI port peripheral chip select should be asserted at a time. The exemplary temperature sensor should be monitored to report temperature conditions outside of a predetermined operating range.

EEPROMs and temperature sensors for each receiver may be accessed via an SPI interface by the host processor 720. The FPGA 740 may provide a 2.5V interface to each receiver and may provide an SPI master controller for DSP access. In one embodiment, the host SPI interface may be configured as shown below in Table 17. The information contained in Table 17 is exemplary only and should not in any way limit the scope of the claims appended herewith.

TABLE 17

| | |
|---|---|
| PD23 | RX1_TEMP_CSn |
| PD24 | RX1_EEPROM_CSn |
| PD25 | RX2_TEMP_CSn |
| PD26 | RX2_EEPROM_CSn |

Generally, one of these four configurations should be active low to enable the SPI read/write access. One exemplary EEPROM may be, but is not limited to, an Atmel 25128 device. An exemplary temperature sensor may be, but is not limited to, a Burr-Brown TMP 123 device.

The host processor 720 may individually or plurally reset a number of devices. These devices may be, but are not limited to, the Flash memory 780, the interface FPGA 740, the DSP(s) 730a, 730b, the Ethernet PHY and the PDC 750. The pins may be input at power-up and may have pull-up or pull-down resistors to establish the proper state until the host processor 720 is able to program the port. Exemplary pin assignments are shown below in Table 18. Generally a logic zero on the pin will assert a reset to the corresponding device. The information contained in Table 18 is exemplary only and should not in any way limit the scope of the claims appended herewith.

TABLE 18

| Device | Host Pin | Comment |
|---|---|---|
| DSP-A & DSP-B | PB17 | Reset with logic 0 - Reset pulse width >2 ms |
| FLASH | PB18 | Reset with logic-0 - Reset pulse width >100 ns |
| Interface FPGA (after configuration) | PB19 | Reset with logic 0 - Reset pulse width >50 ns |
| Interface FPGA (to configure) | PB26 | Reset with logic 0 to 1 transition - Logic 0 Config pulse width >40 us |

TABLE 18-continued

| Device | Host Pin | Comment |
|---|---|---|
| Ethernet PHY (BCM5325E) | PB16 | Reset with logic 0 - Reset pulse width >10 ns. Allow 300 us recovery after reset. Allow 1 ms before accessing registers. |
| PDC | PB15 | Reset with a logic 0 |

One exemplary and non-limiting Flash memory 780 may be a 16 MByte X32 array having two Intel RC28F256P30B85 and/or RC28F256K3C120 series synchronous Flash memories, depending upon the respective assembly. The Flash memory 780 may be placed on a 60x bus 729 and may employ CSO and may be controlled by a general-purpose chip-select machine ("GPCM"). The Flash memory 780 may power-up in asynchronous page mode and may also be operated in this mode for read operations. Programming algorithms and command sets are described in respective Flash memory data sheets and, for brevity, are incorporated herein in their entirety. Flash security and control connections are shown in Table 19 below. The information contained in Table 19 is exemplary only and should not in any way limit the scope of the claims appended herewith.

TABLE 19

| Signal Name | Host I/O Pin | Comment |
|---|---|---|
| VPP/VPN | PB29 | Powers-up to a logic 0 |
| WP/ | PB31 | Powers-up to a logic 0 |

The host processor 720 may also have access to an SDRAM 784 resident on the 60xbus 729. The host processor 720 may utilize an SDRAM controller resident therein and may be configured for page based interleaving and single MPC8270 mode. For GPS antenna voltage control, the host processor 720 may select the voltage applied to the low noise amplifier ("LNA") in the GPS antenna via PC4. The respective bit should be a logic 1 for 5 volt LNAs and a logic 0 for 3.3 LNAs. The power-up default may be 3.3 volts. GPS connections are shown in Table 20 below. The information contained in Table 20 is exemplary only and should not in any way limit the scope of the claims appended herewith.

TABLE 20

| Signal Name | Host I/O Pin | Comment |
|---|---|---|
| GPS Antenna Voltage Select | PD27 | PD27 = 0 VANT = >5.1 VDC NOMINAL<br>PD27 = 1 VANT = >3.4 VDC |

The host processor 720 may also include a test clock control function which enables and disables the reference clock frequency, e.g., 76.8 MHz. Generally, a logic 0 may turn the clock output off. These connections are shown in Table 21 below. The information contained in Table 21 is exemplary only and should not in any way limit the scope of the claims appended herewith.

TABLE 21

| Signal Name | Host I/O Pin | Comment |
|---|---|---|
| Test Clock Control | PA2 | 1 = disabled (normal)<br>0 = enabled (test) |
| Test Clock | PA0 | JTAG Test Clock |

A host controlled I2C interface 791 may be provided in certain embodiments of the present subject matter to read secondary main board temperature sensors and the FPGA temperature via an exemplary two-channel temperature sensor (e.g., T.I./Burr-Brown TMP421). One embodiment of the present subject matter may also connect the I2C interface 791 with the Mezzanine 770. For example, one device 772 or channel may be sensed locally on the TMP421 device on the board temperature near the FPGA 740 and a second device 772 or remote channel may be the FPGA temperature. In the event, any one or both temperatures exceed a predetermined threshold, a safe shutdown may occur. The I2C interface may utilize two PDx I/O lines and provide an I2C SCLK (clock) and SDA (data) as shown below in Table 22. The information contained in Table 22 is exemplary only and should not in any way limit the scope of the claims appended herewith.

TABLE 22

| Signal Name | Host I/O Pin | Comment |
| --- | --- | --- |
| I2C SCL | PD14 | I2C Interface Clock |
| I2C SDA | PD15 | I2C Interface Serial Bi-directional data |

An exemplary IRX may include a hardware watchdog timer 790 (e.g, a Maxim MAX6369 or other timer) that is different from the WDT provided in the interface FPGA 740. This timer 790 may trigger a reset of the host processor 720 and Flash memory 780 which may, in turn, reset the DSP(s) 730a, 730b, the FPGA 740, the Flash memory 780, Ethernet PHY, and the PDC 750. To preclude resets, the host processor 720 may toggle an input pin to the watchdog timer 790 by toggling PC2. The pin may power-up to a one, and the host processor 720 may initiate a 1 to 0 transition on this pin in less than 59 seconds from power-on to avoid a reset. The processor 720 may then continue toggling this pin from that point onward to avoid a reset. Of course, the interval between each toggle may be programmable and/or disabled as shown in Table 23 below. The information contained in Table 23 is exemplary only and should not in any way limit the scope of the claims appended herewith.

TABLE 23

| WDT_SET2 (PD7) | WDT_SET1 (PD6) | WDT_SET0 (PD5) | MAX6369 Timeout Interval (Min in seconds) |
| --- | --- | --- | --- |
| 0 | 0 | 0 | 0.001 |
| 0 | 0 | 1 | 0.01 |
| 0 | 1 | 0 | 0.03 |
| 0 | 1 | 1 | DISABLED |
| 1 | 0 | 0 | 0.1 |
| 1 | 0 | 1 | 1 |
| 1 | 1 | 0 | 10 |
| 1 | 1 | 1 | 60 |

Two I/O pins, e.g., PA0, PA2, on the host processor 720 may be assigned to JTAG test operation to improve JTAG test coverage. In this example, PA0 (test clock) may be set as logic zero and PA2 (TEST_CLK_SEL/) may be set to logic one during normal operation. Additionally, the host processor 720 may control any IRX fans via I/O pin PD20. A logic zero may enable the fans and may be the default condition after power interruption. The host processor 720 may also monitor the ambient temperature using a Temp Monitor A/D.

The interface FPGA 740 may also manage the interface between the local bus 726 of the host processor 720 and the DSP cluster bus 743. The host processor 720 has complete access to peripherals residing in or connected to the interface FPGA 740 and that are effectively on the DSP cluster bus 743. The host processor 720 may utilize the GPCM assigned to the local bus 726 and may conduct data transfers in a programmed controlled mode. Control signals for DMA transfers to and from the host processor 720 may be connected to the interface FPGA 740. The host processor 720 may transfer data to the DSP(s) 730a, 730b using a DSP autoDMA function or by directly writing to a desired individual memory location(s) or register within the DSP. The autoDMA function does not involve the DSP core processor, and direct transfers may involve the core. The DSP 730a, 730b may be booted via the autoDMA function. The host processor 720 may read data from the DSP 730a, 730b using programmed controlled transfers. By way of a not limiting example, single transactions may generally be a single word, a double word (two 32 bit words) or up to 32 quad (128, 32 bit word) words. (Valid numbers of 32 bit word transfers may be 1, 2, 4, 8, 12, 16, 20, . . . , 128). One embodiment of the present subject matter may conduct a programmed controlled data transfer to the DSP 730a, 730b by (1) reading the LCL_CMD register and testing the HOST_PORT_BUSY bit via a LCL_CMD register read or by sampling I/O pin PC6; (2) when the port is not busy, the host processor may write the address of the DSP register or memory location that it wishes to access to the LCL_ADDR register. In case of multiple word transfers, the first location should be sent; (3) the host processor may then write the data (up to 128, 32 bit word) to the LCL_DATA register; (4) the host processor may then write an appropriate command to the LCL_CMD register informing the interface FPGA the number of 32 bit word to transfer [BURST_COUNT] and that the host processor is conducting a write operation [READ bit to a logic 0).

At this point, the interface FPGA 740 may transfer data to the DSP 730a, 730b without further intervention from the host processor 720. When the data transfer is complete, the interface FPGA 740 may reset the HOST_PORT_BUSY bit. Since I/O pin PC6 is in the C port, it may be configured so that an interrupt is generated to the host processor 720 upon completion. Thus, if the host processor 720 wishes to transfer additional blocks of data, the processor 720 may poll the HOST_PORT_BUSY bit at I/O pin PC6, read to the LCL_CMD register, or the processor may configure the HOST_PORT_BUSY bit at I/O pin PC6 to generate an interrupt upon completion of the transfer. To conduct a programmed controlled transfer from the DSP 730a, 730b, the following non-limiting process may be utilized: (1) read the LCL_CMD register and test the HOST_PORT_BUSY bit via a LCL_CMD register read or by sampling I/O pin PC6; (2) when the port is not busy, the host processor may write the address of the DSP register or memory location that it wishes to access to the LCL_ADDR register; (3) the host processor may then write the appropriate command to the LCL_CMD register informing the interface FPGA the number of 32 bit words to transfer and that the host is conducting a read operation [READ bit is set to a logic 1]; (4) read the LCL_CMD register and test the HOST_PORT_BUSY bit via a LCL_CMD register read or by sampling I/O pin PC6; (5) the host processor may then read the data (up to 128, 32 bit word) from the LCL_DATA register.

Data transfers using the autoDMA function are essentially identical to the procedure described above for programmed controlled writes. One difference is that the TCB registers for the autoDMA channel may be set-up in the DSP 730a, 730b prior to data transfer by conducting a programmed controlled quad word write to the TCB register for the desired autoDMA channel in the DSP 730a, 730b. Once this is completed, the host processor 720 may transfer its data using the procedure described above. It should be noted that the length of the DMA transfer may not be a 128, 32 bit word. For example, to establish a DMA transfer of 4096 word, the host processor 720 may set-up the DSP TCB register for the desired autoDMA channel and then transfer (4096/128) blocks of 128 word to the DSP 730a, 730b, via the interface FPGA 740, using the procedure described above. When the DSP 730a, 730b receives the 4096 word, it may terminate the DMA.

In embodiments of the present subject matter where the interface FPGA 740 does not include an SDRAM controller, the process of transferring data from the host processor 720 to the DSP SDRAM 784 may be circuitous. For example, the host processor 720 may fill a buffer in DSP memory using a programmed controlled or an autoDMA transfer. When the buffer is full, the host processor 720 may set up two DMA channel TCBs via two quad-word writes to configure a DSP controlled transfer of the data from the buffer to the SDRAM 784. When the TCBs are established, the DSPs may transfer data from internal memory to the SDRAM 784. When the DSP(s) completes the transfer, it may interrupt or set a flag for the host processor 720. This process may be repeated until all data is transferred. Other embodiments may also utilize ping pong buffers in the DSP memory to speed up data transfer. Further, as embodiments of the present subject matter may include four external port DMA channels, up to four DMAs may operate simultaneously. A read process from the SDRAM 784 is essentially a reverse of this process. AutoDMA cannot be used for reading data, thus transfers from the DSP 730a, 730b to the host processor 720 may be program controlled. For host processor transfers to/from interface FPGA based peripheral devices, the host processor 720 may read and write from/to the peripheral devices, including the PDC 750, the Mezzanine 770, etc. using for example, single word (32 bit) transfers. An exemplary procedure may be identical to the programmed controlled transfer described above.

The DSP(s) 730a, 730b, may interface with an exemplary memory device such as, but not limited to a, 32M×64 SDRAM, 16M×64 SDRAM, etc. 760, peripheral devices resident in the interface FPGA 740, and peripheral devices on the peripheral bus port of the FPGA 740. In one embodiment of the present subject matter, the DSP may provide for two types of peripheral interfaces. One is an interface to simple peripherals resident in or accessible through the interface FPGA 740. The DSP 730a, 730b may transfer data to/from these peripheral devices using a slow device protocol. An exemplary interface FPGA 740 may add additional wait states to the protocol by de-asserting ACK thereby allowing for additional time for transactions to/from the PDC 750 and Mezzanine 770. A second interface may be the sampled data interface with the PDC 750. Data may be transferred from the PDC 750 to the SDRAM 760 via a cluster bus in a two step process, the first step involving the interface FPGA 740 buffering baseband samples of data to fill 128, 64 bit words. When the buffer is full, the interface FPGA 740 may burst the data to the DSP 730a, 730b via autoDMA channel 0. When all data has been transferred to the DSP 730a, 730b, the autoDMA channel may interrupt and, in response to the interrupt, the DSP 730a, 730b may commence an external port DMA process bursting the data into 128 consecutive memory locations in the SDRAM 760. When this external port DMA process is completed, the DMA channel may interrupts the DSP 730a, 730b which then establishes another autoDMA cycle. While the buffer of data is being transferred from the DSP 730a, 730b to the SDRAM 760, a second buffer may be filled in the interface FPGA 740. When the second buffer has been filled, the interface FPGA 740 may begin transferring the data in this second buffer to the DSP 730a, 730b via autoDMA channel 0, and the two step transfer process repeated. This process may continuously be repeated until the DSP 730a, 730b has all necessary data. In general terms, the overall sampled data collection process should proceed after the RTC in the interface FPGA 740 and the PDC 750 are properly synchronized with a GPS reference as follows: (1) the DSP may receive a DF_REQ message from the host processor to perform a data collection at a given time of day; (2) the DSP may establish the hardware (PDC, downconverter, external RF switch, etc.) to perform this operation per the message; (3) the DSP may acquire the RTC semaphores (SEM_RTC) in the interface FPGA; (4) the DSP may writes 0 to the RTC_TT_DRDY_ARM bit and select the number of IF channels by writing to the RTC_CFG/STAT register; (5) the DSP may then utilize the software generated time tag function to poll the RTC for seconds and fractions of second so the DSP may know precisely when the requested start time of the collection has passed; (6) the DSP may arm time tagging by writing 1 to the RTC_TT_DRDY_ARM bit (RTC_CFG/STAT register) to arm the collection process and on the next assertion of FRAME_SYNC_A by the PDC, the RTC may time tag that sample, and the interface FPGA resident PDC sampled data interface begins storing data in the 128 word buffers; (7) the DSP may read the TIMESEC and TIMEFRAC registers to obtain the time tag data; (8) the two step process of transferring 128 word blocks of data from the interface FPGA to the DSP and then to the SDRAM using chained DMA continues until the DSP has all necessary data; and (9) after the numbers of samples required for the collection have been stored in the SDRAM, the DSP resets the DATA_RDY_ARM bit in the RTC_CFG/STAT register to stop the PDC sampled data interface in the interface FPGA.

In one embodiment of the present subject matter, there may be 256 Mbytes of SDRAM or more available to the DSP 730a, 730b on the cluster bus. The base address may be SDRAM bank 0 (0x40000000). The SDRAM may be arranged, in one embodiment, as a 32M×64 bit word, and the DSP 730a, 730b may utilize its internal SDRAM controller to interface to this device.

Each DSP 730a, 730b may include four or more link ports. In one embodiment, link port 3 may be connected to the Mezzanine 770 interface connector. Link ports 0 and 1 may be connected to the interface FPGA 740 as a contingency for both messaging and transferring sampled data to the DSP 730a, 730b. Link port 2 may be cross-connected between the DSPs to provide a DMA capability between DSPs.

The host processor 720 and the DSPs 730a, 730b may interrupt and/or provide status to each other as connected via the FPGA 740. The host processor I/) and IRQ pins may be connected to the FPGA 740 and may be routed as desired. Exemplary signals may be, but are not limited to: HOST_To_FPGA_SPARE0-7 (PA22-25; PB9-12); /IRQ1-5; PC0-11 (all 12 may be used to interrupt and/or provide status to the HOST). The DSP FLAG, IRQ, and DSP timer output signals may also be connected to the FPGA 740 and may be routed as desired. These signals may be, but are not limited to: DSP_FLAG[0-3]_A, DSP_FLAG[0-3]_B; DSP_IRQ[0-3]_A, DSP_IRQ[0-3] B; \DSP_TMROE_A, \DSP_TMROE_B.

Peripheral devices not connected directly to the host processor 720 may be memory mapped on to the DSP cluster bus. In one embodiment, there may be six memory banks on the cluster bus, four of which may be allocated to the SDRAM 760 and two available for general purpose peripherals. As an example, the SDRAM banks may be 67 megaword deep, and the general purpose banks (0 and 1) may be 134 megaword deep. External banks may be allocated for peripherals as necessary, MSSD banks and SDRAM banks may also be allocated as necessary.

The interface FPGA 740 may include several peripheral functions required by the system. Some resources that are accessed by the host processor 720 and DSPs 730a, 730b are semaphored to guarantee uninterrupted access. Simple hardware semaphores may be implemented as memory-mapped registers in the interface FPGA 740 and may be obtained by reading the semaphore location until a value of 0 is returned. Writing to the semaphore location releases the semaphore. Hardware semaphores may be utilized for resources that are accessed infrequently or for brief periods of time; thus, in general, the semaphore acquisition process may consume inconsequential external bus bandwidth without having to resort to software mechanisms for reducing the duty cycle of the associated external bus read operations.

IRX RF hardware may include hardware components that should be established and controlled as part of normal operation. For example, exemplary receivers may be controlled using three serial busses connected to the FPGA 740. One for the synthesizer, one for the EEPROM and temperature sensor, and one controlling the step attenuators and other assorted control functions. Each receiver may also include two SPI controlled devices including a temperature sensor and an EEPROM. The EEPROM may store calibration constants for the receiver and model number information. The host processor 720 may provide the SPI interface to the receivers via the FPGA 740. The DSP 730a, 730b and/or host processor 720 may write the synthesizer 32 bit configuration words to the memory mapped FPGA register to initiate a serial transfer of data to each receiver. The FPGA 740 controls the parallel to serial function to minimize overhead. A busy bit status may be available to mark when the serial transfer has been completed and may be read by either the DSP 730a, 730b or host processor 720. A simple write to the respective register within the FPGA may initiate a data transfer.

The DSP 730a, 730b and/or host processor 720 may write the 27 bit control word register to initiate a serial transfer of data to each receiver. The FPGA 740 may control the parallel to serial function to minimize overhead. A busy bit status may be available to mark when the serial transfer has been completed and may be read by either the DSP 730a, 730b or host processor 720. The two step attenuators may be daisy chained with two additional 8 bit shift registers, resulting in a 27 bit control word for the control word. A simple write to the respective memory mapped register within the FPGA 740 may initiate a data transfer to the selected receiver.

An exemplary but non-limiting process for configuring the receivers may be: (1) acquiring the RF_SEM using the procedure with regard to semaphores above; (2) once the semaphore is acquired, the host processor 720 or the DSP 730a, 730b may write the number of bits to be transferred and the destination to the interface FPGA RF_CNTL register; (3) write the data to be transferred to the FPGA RF_DATA register. Once these steps have been completed, the interface FPGA 740 may conduct a parallel to serial conversion and clock the serialized bit stream into the proper register. The FPGA 740 may also sets the BUSY bit in RF_CNTL at the beginning of the parallel to serial conversion process. The host processor 720 or the DSP 730a, 730b may monitor the BUSY bit by reading the RF_CNTL register to determine when the transaction is complete. When the BUSY bit is de-asserted, the host processor 720 or the DSP 730a, 730b may release the semaphore or may write additional data by repeating steps (2) and (3) above.

In one embodiment of the present subject matter, the PDC 750 may be configured to baseband and filter from any number of digitized IF channels. In the non-limiting examples provided above, the PDC 750 may be configured to baseband and filter from 4 digitized channels. An exemplary PDC may be a TI GC5016 PDC; however, it is envisioned that any number of similar devices may be used and such an example should not limit the scope of the claims appended herewith. Baseband signals may be routed to the FPGA 740 which then stores them in the DSP SDRAM 760 using a two step DMA transfer. The PDC 750 may be established and controlled via its control interface and may reside on the peripheral bus port of the interface FPGA 740 with the Mezzanine 770. The PDC 750 may thus be accessible to both the host processor 720 and the DSP 730a, 730b. The IF inputs to the PDC 750 may be, in one embodiment, each 16 bit twos compliment, real, and sampled at 76.8 MSamples/second, and the respective channels may be connected to the 16 MSBs of the corresponding PDC input.

Management of the PDC 750 may be accomplished with, in certain embodiments, a 16-bit control (C-bus) port. PDC register configuration, status and data read, device synchronization, and even resetting may also be accomplished through this port. To read from or write to an internal PDC register, a transaction may be initiated over the PDC C bus. The 8 LSBs of an address provided by the host processor 720 or DSP 730a, 730b may be used in PDC control port accesses. The three MSBs, when set to 100b, may select the PDC control port and cause the PDC CE/ input to be asserted. The 5 LSBs of the address may be routed directly to the PDC 750 and correspond to a 5 bit address (A [4.0]) of the PDC 750. In one embodiment, to read the global General Sync register, a read may be conducted on address location Bank0+0x81. The 8 indicates to the interface FPGA 740 that the PDC 750 has been selected causing the FPGA 740 to assert the PDC chip select. The 1 indicates to the PDC 750 that the General Sync register has been addressed. The 16 bits of data routed to the PDC 750, in this example, may correspond to the 16 LSBs of the cluster data bus word half being utilized (i.e., bits 0 to 15 for even addresses and 32 through 47 for odd addresses) or the 16 LSBs of the local data bus. The sync bits S1A/ and S1B/ bits may be controlled via the RTC_CFG/STAT register. Both signals may be synchronized to a 1PPS signal, to an EXT_TRIG signal or other suitable signal. A PDC reset may be asserted following a power-up, a watchdog timeout or upon host processor 720 assertion of the PDC reset I/O pin.

In one embodiment of the present subject matter, there may be four eight bit output channels from the PDC 750 to the FPGA 740 which utilize the 8 MSBs of each PDC channel. Of course, depending upon the PDC employed this may change. One channel may be assigned to each RF channel, and the data from the port may be complex. The I and the Q data may be 8, 16, etc. bits each. For example, for 8 bit I and 8 bit Q, two bytes may be transferred per complex sample; for 16 bit I and 16 bit Q, the data may be transferred at a rate of 4 bytes per sample; and so forth. The format of data stored in SDRAM is provided in Table 24 below. In this non-limiting example, each 64 bit memory word may contain multiple samples from any given channel, and the data for each channel may be interleaved in consecutive memory locations as shown. Each row in Table 24 represents a 64 bit SDRAM memory location and thus each table may generally represent either two or four consecutive memory locations. The information contained in Table 24 is exemplary only and should not in any way limit the scope of the claims appended herewith.

TABLE 24

| Two IF Channels (A and B) 16 bit I and Q | | | | | | | |
|---|---|---|---|---|---|---|---|
| 63 | 48 | 47 | 32 | 31 | 16 | 15 | 0 |
| Chan A[n + 1] Q | | Chan A[n + 1] I | | Chan A[n] Q | | Chan A[n] I | |
| 63 | 48 | 47 | 32 | 31 | 16 | 15 | 0 |
| Chan B[n + 1] Q | | Chan B[n + 1] I | | Chan B[n] Q | | Chan B[n] I | |
| 63 | 48 | 47 | 32 | 31 | 16 | 15 | 0 |
| Chan A[n + 3] Q | | Chan A[n + 3] I | | Chan A[n + 2] Q | | Chan A[n + 2] I | |
| 63 | 48 | 47 | 32 | 31 | 16 | 15 | 0 |
| Chan B[n + 3] Q | | Chan B[n + 3] I | | Chan B[n + 2] Q | | Chan B[n + 2] I | |
| Four IF Channels (A, B, C and D) 16 bit I and Q | | | | | | | |
| 63 | 48 | 47 | 32 | 31 | 16 | 15 | 0 |
| Chan A[n + 1] Q | | Chan A[n + 1] I | | Chan A[n] Q | | Chan A[n] I | |
| 63 | 48 | 47 | 32 | 31 | 16 | 15 | 0 |
| Chan B[n + 1] Q | | Chan B[n + 1] I | | Chan B[n] Q | | Chan B[n] I | |
| 63 | 48 | 47 | 32 | 31 | 16 | 15 | 0 |
| Chan C[n + 1] Q | | Chan C[n + 1] I | | Chan C[n] Q | | Chan C[n] I | |
| 63 | 48 | 47 | 32 | 31 | 16 | 15 | 0 |
| Chan D[n + 1] Q | | Chan D[n + 1] I | | Chan D[n] Q | | Chan D[n] I | |
| Two IF Channels (A and B) 8 bit I and Q W-CDMA | | | | | | | |
| 63 56 | 55 48 | 47 40 | 39 32 | 31 24 | 23 16 | 15 8 | 7 0 |
| Chan A[n + 3] Q | Chan A[n + 3] I | Chan A[n + 2] Q | Chan A[n + 2] I | Chan A[n + 1] Q | Chan A[n + 1] I | Chan A[n] Q | Chan A[n] I |
| 63 56 | 55 48 | 47 40 | 39 32 | 31 24 | 23 16 | 15 8 | 7 0 |
| Chan B[n + 3] Q | Chan B[n + 3] I | Chan B[n + 2] Q | Chan B[n + 2] I | Chan B[n + 1] Q | Chan B[n + 1] I | Chan B[n] Q | Chan B[n] I |
| Four IF Channels (A, B, C and D) 8 bit I and Q W-CDMA | | | | | | | |
| 63 56 | 55 48 | 47 40 | 39 32 | 31 24 | 23 16 | 15 8 | 7 0 |
| Chan A[n + 3] Q | Chan A[n + 3] I | Chan A[n + 2] Q | Chan A[n + 2] I | Chan A[n + 1] Q | Chan A[n + 1] I | Chan A[n] Q | Chan A[n] I |
| 63 56 | 55 48 | 47 40 | 39 32 | 31 24 | 23 16 | 15 8 | 7 0 |
| Chan B[n + 3] Q | Chan B[n + 3] I | Chan B[n + 2] Q | Chan B[n + 2] I | Chan B[n + 1] Q | Chan B[n + 1] I | Chan B[n] Q | Chan B[n] I |
| 63 56 | 55 48 | 47 40 | 39 32 | 31 24 | 23 16 | 15 8 | 7 0 |
| Chan C[n + 3] Q | Chan C[n + 3] I | Chan C[n + 2] Q | Chan C[n + 2] I | Chan C[n + 1] Q | Chan C[n + 1] I | Chan C[n] Q | Chan C[n] I |
| 63 56 | 55 48 | 47 40 | 39 32 | 31 24 | 23 16 | 15 8 | 7 0 |
| Chan D[n + 3] Q | Chan D[n + 3] I | Chan D[n + 2] Q | Chan D[n + 2] I | Chan D[n + 1] Q | Chan D[n + 1] I | Chan D[n] Q | Chan D[n] I |

The Mezzanine 770 may be resident on an external port of the interface FPGA 740 and may be memory mapped and occupy the space, for example, bank°±0xA0 to 0xBF. The hardware watchdog timer ("WDT") 790 may assert a WATCHDOG Reset signal if a read is not performed on a WDT_DELAY register at least once every N seconds, where N corresponds to the watchdog interval. The watchdog interval may be selectively programmed in 1 second steps from 1 to 65535 seconds by writing to the WDT_DELAY register. Writing a value of zero for the interval may disable the WDT 790. In one embodiment, the WDT 790 may default to an interval of 30 minutes following configuration of the interface FPGA 740.

To assist with the adjustment of receiver gain, a threshold circuit may be provided for each IF channel in some embodiments. One exemplary threshold circuit may note the five MSBs of the corresponding ADC output and count the number of times a predetermined threshold has been exceeded by the DSP 730a, 730b during a collection of ADC samples. For example, a MEAS_EN_CH_x (bit 5 of THLD_CH_x) may be set to 1 by the DSP 730a, 730b to initiate counting for a given channel, after first setting the threshold value (bits 0-4). The DSP 730a, 730b may then loop on reading THLD_CH_x. When MEAS_EN_CH_x field reads as 0, the measurement may be considered complete, and the LIM_CNT_CHxfielD contains the number of times the ADC channel x MSBs exceeded the predetermined threshold. Once the measurement circuit commences, if the FPGA Reset is not asserted, the circuit may complete the measurement. Asserting the FPGA reset may terminate the measurement and reset the LIM_COUNT field register and the counter that counts the threshold crossings to zero. The measurement may complete independent of PDC collection length. Once the DSP 730a, 730b has initiated a measurement, if FPGA_RESET is not asserted, the measurement may run to completion regardless of any additional transitions on the MEAS_EN_CH_x bit. To initiate another measurement, the DSP 730a, 730b may, after one measurement is completed, write a 1 to the MEAS_EN_CH_x bit. The LIM_COUNT field may be zeroed by the FPGA_RESET or, of course, a measurement of zero counts above the threshold.

Certain embodiments may include a real time clock ("RTC") providing time tagging logic and other synchronization functions. The RTC may employ, in one example, a time resolution of 1/76.8 MHz and may include a 29-bit counter that counts whole seconds and a 27 bit counter that counts fractions of a second. Exemplary RTC parameters are provided in Table 25 below. The information contained in Table 25 is exemplary only and should not in any way limit the scope of the claims appended herewith.

TABLE 25

| PROCCLK Option | Min Value (Hex) | Max Value (Hex) | Offset Value | Normalizing Value |
|---|---|---|---|---|
| 76.8 MHz | 0x0016C2003 | 0x0600 002 | 23,863,298 | 76,800,000 |

An exemplary RTC may also include logic to select a SYNC source for the PDC(s) 750. PDC(s) 750 may be synchronized from software via a PDC control bus interface, to a timing signal such as, but not limited to, a GPS__1PPS signal, an EXT_TRIG signal, etc. For example, when the GPS__1PPS signal or the EXT_TRIG signal are utilized as the synchronization source, both SIA/ and SIB/ occur at the same point in time. The delay from the assertion of the GPS__1PPS signal until the PDC 750 is synchronized may be between 3 and 4 clock periods. RTC_CFG/STAT may generally be a read/write register selecting various configuration options and enabling time tagging features. SW_TT may be a write only register allowing a programmer to generate a pulse for software controlled time tagging operations. PPS_DETECT may be a read/write register indicating arrival of a GPS__1PPS signal. TIMESEC and TIMEFRAC may be read only register holding whole seconds and fractions of a second time tags, respectively. Performing a read operation on a register containing fractions of a second may also return the time tag and clear corresponding status flags in RTC_CFG/STAT. SEC_RESET may be a write only register selecting whether or not the whole seconds of the RTC are to be reset to zero upon the next GPS__1PPS signal. To keep the RTC counter synchronous with GPS, the RTC fractions of a second may be reset upon the arrival of each GPS__1PPS signal, assuming the GPS__1PPS is synchronous with the GPS timing reference and drift of the GPS timing reference in one second is negligible.

In one non-limiting embodiment, to synchronize the RTC to GPS, the following process may be utilized: (1) the host processor obtains the semaphore for the RTC (SEM_RTC register in RTC); (2) the host processor enables zeroing of RTC sub-seconds upon 1PPS pulses and disables the 1PPS pulse (RTC_CFG/STAT register in the RTC); (3) the host processor may arm the reset for the RTC whole seconds (SEC_RESET register in RTC); (4) the host processor clears the 1PPS arrival flag (PPS_DETECT register in RTC); (5) the host processor enables the 1PPS pulse (RTC_CFG/STAT register in RTC); (6) the host processor polls the 1PPS arrival flag (PPS_DETECT register in RTC); (7) when a 1PPS signal is detected (the whole seconds may be reset by the hardware), the host processor enables communication with the GPS receiver over a communication port; (8) the host processor reads the comprehensive time packet when it arrives from the GPS receiver via an SMC2 channel. The host processor passes this value to the DSP, and any subsequent RTC time value may now be added to this GPS reference time to obtain system absolute time with respect to GPS; (9) the host processor disables communication with the GPS receiver over the SMC2 channel; (10) the host processor releases the semaphore for the RTC (SEM_RTC register in RTC). It should be noted that the above process is exemplary only and should not limit the scope of the claims appended herewith as any number of RTC synchronization processes may be utilized in embodiments of the present subject matter.

Generally, the RTC should be synchronized to absolute (GPS) time prior to utilization of a time tag. The DSP 730*a*, 730*b* may track time by tagging a specific sample with a reference time value obtained from the RTC and then count samples thereafter. One exemplary RTC may include a pulse generator having a period of 1 Hz to facilitate testing of 1PPS time tagging in the RTC. The pulse generator output may be substituted for the GPS__1PPS signal, to facilitate testing by setting the RTC__1PPS_TEST_SEL bit in the RTC_CFG/STAT register. The status of time tag functions may be obtained by reading the RF_CFG/STAT register. This register may include flags indicating whether a time tag is available in a TT register (TT_STAT_AVL) and whether multiple time tag capturing pulses have arrived since the first time tag capturing pulse arrived (TT_STAT_MISSED). When a time tag capturing pulse such as EXT_TRIG arrives, the corresponding TT_STAT_AVL bit of the TT_STAT register may go high. If another time tag capturing pulse arrives before TT_STAT_AVL is cleared by the DSP 730*a*, 730*b* or host processor 720, the TT_STAT_MISSED bit may go high; however, the time captured by the first pulse to trigger a time tag may remain in the TT register until TT_STAT_AVL may be set low. The flag corresponding to a time tag may be cleared whenever the TT register is read.

With reference to FIGS. 1-7, one embodiment of the present subject matter may provide a receiver for receiving signals from plural frequency bands and plural communication protocols. The receiver may include an interchangeable RE front end having an A/D converter and an EEPROM having calibration data. The RF front end may receive configuration data or upgrade data from a remote site and may also include calibration circuitry. The RF front end or circuitry may receive RF signals from these plural frequency bands and communication protocols. The receiver may also include IF circuitry producing one or more common IF signals from the received RF signals and circuitry for digitizing the one or more common IF signals. The receiver may additionally include common digital circuitry or a back end for receiving the digitized versions of the IF signals. In this embodiment, the digitized signal may be modified as a function of the plural communication protocols. The digital back end may have a host processor operatively connected to a host memory device via a host bus and one or more DSPs each operatively connected to at least one DSP memory device via a cluster bus. A FPGA may also be operatively connected to the host processor, the one or more DSPs, a mezzanine bus, and the IF circuitry. When the FPGA receives the IF signal, it may determine a destination for the signal for processing where the destination is one of the one or more DSPs or the host processor, and the FPGA may provide the IF signal to the determined destination. The receiver may further include a GPS receiver or an appropriate timing synchronization source for supplying timing signals to the RF front end and the common digital back end, and a flash memory device operatively connected to the host bus for supplying configuration information. In one embodiment, the digital back end may receive configuration data or upgrade data from a remote site.

Another embodiment of the present subject matter may include a receiver for receiving signals from plural frequency bands and communication protocols, the receiver including an interchangeable RF front end that receives RF signals from the plural frequency bands and communication protocols and IF circuitry producing one or more common IF signals from the received RF signals. The receiver may also include a common digital back end for receiving digitized versions of the IF signals, for modifying IF signal bandwidth as a function of the plural communication protocols, and for processing plural received signals without knowledge of the underlying communication protocols. Another embodiment of the receiver may include a GPS receiver or a timing synchronization source for supplying timing signals to the RF front end and common digital back end, and may include a flash memory device for supplying configuration information. The common digital back end of the receiver may, in another embodiment, include a host processor operatively connected to a host memory device via a host bus, one or more DSPs each operatively connected to at least one DSP memory device via a cluster bus, and an FPGA operatively connected to the host processor, DSPs, a mezzanine bus, and the IF circuitry.

A further embodiment of the present subject matter may provide a configurable receiver for receiving signals from plural frequency bands and communication protocols. The receiver may include modular RF circuitry having plural separate and selectable RF paths, each path having a predetermined frequency band and may include IF circuitry having plural separate and selectable synthesizing paths, each synthesizing path corresponding to a selectable RF path. Components of the selectable RF and synthesizing paths may be field-configurable as a function of the plural communication protocols. Exemplary components may be, but are not limited to, filters, oscillators, etc. Further, any one or number of temperature-sensitive components of the receiver may be in the removable modules. In one embodiment, the RF circuitry may include two RF modules, each module having three separate and selectable RF paths and may also include an EEPROM having calibration data. The receiver may also include a converter for digitizing the IF signal and common digital circuitry for receiving and processing the digitized IF signals. The digitized signal may have a bandwidth that changes as a function of the plural communication protocols. In one embodiment, the common digital circuitry may process the plural received signals without knowledge of the underlying communication protocols. In another embodiment, the common digital circuitry may include a host processor operatively connected to a host memory device via a host bus, one or more DSP each operatively connected to at least one DSP memory device via a cluster bus, and an FPGA operatively connected to the host processor, DSPs, a mezzanine bus, and the IF circuitry where the FPGA may receive the IF signal, determines a destination therefor and processes the IF signal where the destination is one of the DSPs or host processor, and the FPGA sends the IF signal to the determined destination. Further, the RF circuitry and digital circuitry may be coherent to a global positioning system reference signal. Another embodiment may also include a flash memory device operatively connected to the host bus for supplying configuration information.

An additional embodiment of the present subject matter may provide another configurable receiver for receiving signals from plural frequency bands and communication protocols, the receiver including modular RF circuitry having at least one separate and selectable RF path, the RF path having a predetermined frequency band, and including IF circuitry having at least one separate and selectable synthesizing path, the synthesizing path corresponding to a selectable RF path. Components of the selectable RF and synthesizing paths may be field-configurable as a function of the plural communication protocols. Exemplary components may be, but are not limited to, filters, oscillators, etc. Further, any one or number of temperature-sensitive components of the receiver may be in the removable modules. In one embodiment, the RF circuitry may include two RF modules, each module having a single RF path and may also include an EEPROM having calibration data. The receiver may also include a converter for digitizing the IF signal and common digital circuitry for receiving and processing the digitized IF signals, and modifying the digitized IF signal bandwidth as a function of the plural communication protocols. In one embodiment, the common digital circuitry may process the plural received signals without knowledge of the underlying communication protocols. In another embodiment, the common digital circuitry may include a host processor operatively connected to a host memory device via a host bus, one or more DSP each operatively connected to at least one DSP memory device via a cluster bus, and an FPGA operatively connected to the host processor, DSPs, a mezzanine bus, and the IF circuitry where the FPGA may receive the IF signal, determines a destination therefor and processes the IF signal where the destination is one of the DSPs or host processor, and the FPGA sends the IF signal to the determined destination. Further, the RF circuitry and digital circuitry may be coherent to a global positioning system reference signal. Another embodiment may also include a flash memory device operatively connected to the host bus for supplying configuration information.

Figure 8:
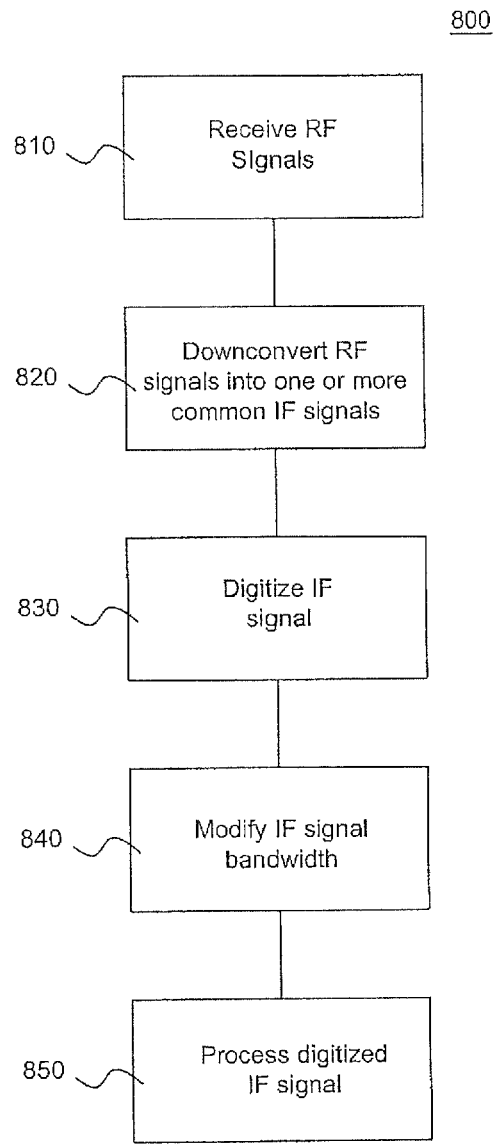
FIG. 8 is a block diagram of one embodiment of the present subject matter.

FIG. 8 is a block diagram of one embodiment of the present subject matter. With reference to FIG. 8, a method 800 is provided for blind determination processing of received signals. At step 810, RF signals may be received from plural frequency bands and plural communication protocols in one or more receiver modules, and at step 820, these received signals may be converted or downconverted into one or more common IF signals. At step 830, the one or more common IF signals may be digitized, and at step 840, the IF signal bandwidth of the digitized signals may be modified as a function of the plural communication protocols. At step 850, the digitized signal may be processed in a processor without knowledge of the underlying plural communication protocols. A further embodiment may include the step of supplying timing signals from a timing synchronization source and/or the step of supplying configuration information to the processor.

Figure 9:
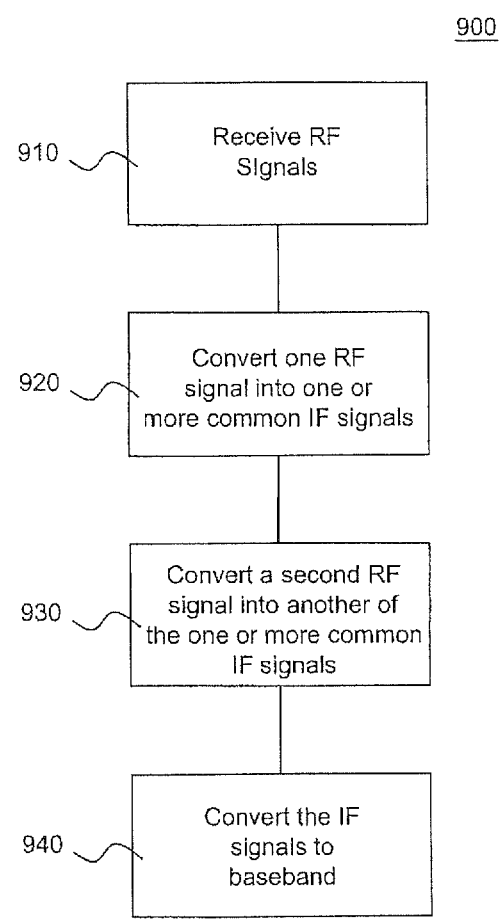
FIG. 9 is a block diagram of another embodiment of the present subject matter.

FIG. 9 is a block diagram of another embodiment of the present subject matter. With reference to FIG. 9, a method 900 is provided for processing signals based on a plurality of frequencies and protocols. At step 910, plural RF signals may be received from plural frequency bands and plural communication protocols, and at step 920, at least one of the plural received RF signals may be converted into one or more common IF signals. At step 930, a second of the plural received signals may be converted into another of the one or more common IF signals. At step 940, the one or more common IF signals may then be converted into one or more baseband signals without knowledge of the underlying plural communication protocols.

As shown by the various configurations and embodiments illustrated in FIGS. 1-9, a system and method for an intelligent radio frequency receiver have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A receiver for receiving signals from plural frequency bands and plural communication protocols, comprising:
   an interchangeable radio frequency ("RF") front end having an analog-to-digital ("A/D") converter and an electrically erasable programmable read-only memory ("EEPROM") having calibration data, wherein said RF front end receives RF signals from said plural frequency bands and said plural communication protocols;
intermediate frequency ("IF") circuitry producing one or more common IF signals from said received RF signals and digitizing said one or more common IF signals;
a common digital back end for receiving digitized versions of said IF signals and modifying IF signal bandwidth as a function of said plural communication protocols, said back end having:
  a host processor operatively connected to a host memory device via a host bus,
  one or more digital signal processors ("DSP") each operatively connected to at least one DSP memory device via a cluster bus, and
  a field programmable gate array ("FPGA") operatively connected to said host processor, said one or more DSPs, a mezzanine bus, and said IF circuitry, wherein said FPGA receives said IF signal, determines a destination for said signal for processing where said destination is one of said one or more DSPs or said host processor, and sends said IF signal to said determined destination;
a global positioning system ("GPS") receiver or a timing synchronization source for supplying timing signals to said RF front end and said common digital back end; and
a flash memory device operatively connected to said host bus for supplying configuration information.

2. The receiver of claim 1 wherein said RF front end receives configuration data or upgrade data from a remote site.

3. The receiver of claim 1 wherein said digital back end receives configuration data or upgrade data from a remote site.

4. The receiver of claim 1 wherein said RF front end further comprises calibration circuitry.

5. A receiver for receiving signals from plural frequency bands and plural communication protocols, comprising:
an interchangeable radio frequency ("RF") front end that receives RF signals from said plural frequency bands and said plural communication protocols;
intermediate frequency ("IF") circuitry producing one or more common IF signals from said received RF signals; and
a common digital back end for receiving digitized versions of said IF signals, modifying IF signal bandwidth as a function of said plural communication protocols, and processing plural received signals without knowledge of the underlying communication protocols.

6. The receiver of claim 5 further comprising:
a global positioning system ("GPS") receiver or a timing synchronization source for supplying timing signals to said RF front end and said common digital back end; and
a flash memory device operatively for supplying configuration information.

7. The receiver of claim 5 wherein the common digital back end further comprises:
a host processor operatively connected to a host memory device via a host bus,
one or more digital signal processors ("DSP") each operatively connected to at least one DSP memory device via a cluster bus, and
a field programmable gate array ("FPGA") operatively connected to said host processor, said one or more DSPs, a mezzanine bus, and said IF circuitry, wherein said FPGA receives said IF signal, determines a destination for said signal for processing where said destination is said one of one or more DSPs or said host processor, and sends said IF signal to said determined destination.

8. A method for blind determination processing of received signals comprising the steps of:
(a) receiving radio frequency ("RF") signals from plural frequency bands and plural communication protocols in one or more receiver modules;
(b) downconverting the received signals into one or more common intermediate frequency ("IF") signals;
(c) digitizing the one or more common IF signals;
(d) modifying signal bandwidth of the digitized signals as a function of the plural communication protocols; and
(e) processing the digitized signals in a processor without knowledge of the underlying plural communication protocols.

9. The method of claim 8 further comprising the step of supplying timing signals from a timing synchronization source.

10. The method of claim 8 further comprising the step of supplying configuration information to the processor.

11. A method for processing signals based on a plurality of frequencies and protocols comprising the steps of:
(a) receiving plural radio frequency ("RF") signals from plural frequency bands and plural communication protocols;
(b) converting one of the plural received RF signals into one or more common intermediate frequency ("IF") signals;
(c) converting a second of the plural received signals into a second of the one or more common IF signals; and
(d) converting the one or more common IF signals into one or more baseband signals without knowledge of the underlying plural communication protocols.

12. A receiver for receiving signals from plural frequency bands and plural communication protocols, comprising:
modular radio frequency ("RF") circuitry having plural separate and selectable RF paths, each path having a predetermined frequency band;
intermediate frequency ("IF") circuitry having plural separate and selectable synthesizing paths, each synthesizing path corresponding to a selectable RF path, said IF circuitry producing one or more common IF signals;
a converter for digitizing said IF signals; and
common digital circuitry for receiving and processing said digitized IF signals,
wherein components of said selectable RF and synthesizing paths are field-configurable as a function of said plural communication protocols.

13. The receiver of claim 12 wherein said common digital circuitry modifies IF signal bandwidth as a function of said plural communication protocols.

14. The receiver of claim 12 wherein said components are selected from the group consisting of filters, oscillators, and combinations thereof.

15. The receiver of claim 12 wherein temperature-sensitive components of the receiver are removable.

16. The receiver of claim 12 wherein the common digital circuitry processes the plural received signals without knowledge of the underlying communication protocols.

17. The receiver of claim 12 wherein the RF circuitry further comprises two RF modules, each module having three separate and selectable RF paths.

18. The receiver of claim 12 wherein the RF circuitry further comprises an electrically erasable programmable read-only memory ("EEPROM") having calibration data.

19. The receiver of claim 12 wherein the RF circuitry and digital circuitry are coherent to a global positioning system reference signal.

20. The receiver of claim 12 wherein the common digital circuitry further comprises:
a host processor operatively connected to a host memory device via a host bus,
one or more digital signal processors ("DSP") each operatively connected to at least one DSP memory device via a cluster bus, and
a field programmable gate array ("FPGA") operatively connected to said host processor, said one or more DSPs, a mezzanine bus, and said IF circuitry, wherein said FPGA receives said IF signal, determines a destination for said signal for processing where said destination is one of said one or more DSPs or said host processor, and sends said IF signal to said determined destination.

21. The receiver of claim 12 further comprising a flash memory device operatively connected to said host bus for supplying configuration information.

22. A receiver for receiving signals from plural frequency bands and plural communication protocols, comprising:
modular radio frequency ("RF") circuitry having at least one separate and selectable RF path, said RF path having a predetermined frequency band;
intermediate frequency ("IF") circuitry having at least one separate and selectable synthesizing path, said synthesizing path corresponding to a selectable RF path, said IF circuitry producing one or more common IF signals;
a converter for digitizing said one or more common IF signals; and
common digital circuitry for receiving and processing said digitized IF signals,
wherein components of said selectable RF and synthesizing paths are field-configurable as a function of said plural communication protocols.

23. The receiver of claim 22 wherein said common digital circuitry modifies IF signal bandwidth as a function of said plural communication protocols.

24. The receiver of claim 22 wherein said components are selected from the group consisting of filters, oscillators, and combinations thereof.

25. The receiver of claim 22 wherein temperature-sensitive components of the receiver are removable.

26. The receiver of claim 22 wherein the common digital circuitry processes the plural received signals without knowledge of the underlying communication protocols.

27. The receiver of claim 22 wherein the RF circuitry further comprises two RF modules, each module having a single RF path.

28. The receiver of claim 27 wherein the IF circuitry further comprises two separate IF paths.

29. The receiver of claim 22 wherein the RF circuitry further comprises an electrically erasable programmable read-only memory ("EEPROM") having calibration data.

30. The receiver of claim 22 wherein the RF circuitry and digital circuitry are coherent to a global positioning system reference signal.

31. The receiver of claim 22 wherein the common digital circuitry further comprises:
a host processor operatively connected to a host memory device via a host bus,
one or more digital signal processors ("DSP") each operatively connected to at least one DSP memory device via a cluster bus, and
a field programmable gate array ("FPGA") operatively connected to said host processor, said one or more DSPs, a mezzanine bus, and said IF circuitry, wherein said FPGA receives said IF signal, determines a destination for said signal for processing where said destination is one of said one or more DSPs or said host processor, and sends said IF signal to said determined destination.

32. The receiver of claim 22 further comprising a flash memory device operatively connected to said host bus for supplying configuration information.

* * * * *